US011991789B2

(12) United States Patent
Umemura et al.

(10) Patent No.: US 11,991,789 B2
(45) Date of Patent: May 21, 2024

(54) HEATER, FIXING DEVICE, IMAGE-FORMING DEVICE, AND HEATING DEVICE

(71) Applicant: Misuzu Industry Co., Ltd., Komaki (JP)

(72) Inventors: Yuji Umemura, Komaki (JP); Tomoyoshi Aoyama, Komaki (JP); Shohei Kato, Komaki (JP); Miho Matsuda, Komaki (JP)

(73) Assignee: Misuzu Industry Co., Ltd., Komaki (JP)

( * ) Notice: Subject to any disclaimer, the term of this patent is extended or adjusted under 35 U.S.C. 154(b) by 1016 days.

(21) Appl. No.: 16/768,747

(22) PCT Filed: Dec. 7, 2018

(86) PCT No.: PCT/JP2018/045179
§ 371 (c)(1),
(2) Date: Jun. 1, 2020

(87) PCT Pub. No.: WO2019/112058
PCT Pub. Date: Jun. 13, 2019

(65) Prior Publication Data
US 2021/0176825 A1 Jun. 10, 2021

(30) Foreign Application Priority Data
Dec. 8, 2017 (JP) ................................ 2017-236487

(51) Int. Cl.
*G03G 15/20* (2006.01)
*H05B 1/02* (2006.01)
(Continued)

(52) U.S. Cl.
CPC ........... *H05B 1/0241* (2013.01); *G03G 15/20* (2013.01); *G03G 15/2042* (2013.01);
(Continued)

(58) Field of Classification Search
CPC ...... H05B 1/0241; H05B 3/0095; H05B 3/03; H05B 3/10; H05B 3/20; H05B 3/265;
(Continued)

(56) References Cited

U.S. PATENT DOCUMENTS 2,533,615 A * 12/1950 Osterheld ................ H05B 3/06 219/544
4,645,146 A * 2/1987 Hall .................. B32B 17/10293 156/304.6
(Continued)

FOREIGN PATENT DOCUMENTS

JP 10-133501 A 5/1998
WO WO 2013/073276 A1 5/2013
(Continued)

OTHER PUBLICATIONS

Machine English Translation of WO-2013073276-A1 (Year: 2013).*
(Continued)

*Primary Examiner* — Helena Kosanovic
*Assistant Examiner* — Erwin J Wunderlich
(74) *Attorney, Agent, or Firm* — Oblon, McClelland, Maier & Neustadt, L.L.P.

(57) ABSTRACT

Provided is a heater that is excellent in heat equalizing property even when being narrow in a sweep direction. Also provided are a fixing device, an image-forming device, and a heating device each including such a heater. A heater is configured to heat an object to be heated in such a manner that at least one of the object to be heated and the heater is swept with the heater disposed opposite the object to be heated. The heater includes a base having a rectangular shape and a plurality of heating cells each independently receiving power supply, the heating cells being disposed on the base and arranged in a longitudinal direction of the base. Each of the heating cells includes a plurality of lateral wires
(Continued)

extending in substantially parallel with the longitudinal direction of the base and a plurality of oblique wires tilted relative to the lateral wires.

5 Claims, 12 Drawing Sheets

(51) Int. Cl.

*H05B 3/00* (2006.01)
*H05B 3/03* (2006.01)
*H05B 3/10* (2006.01)
*H05B 3/20* (2006.01)
*H05B 3/26* (2006.01)
*H05B 3/46* (2006.01)

(52) U.S. Cl.

CPC ..... *G03G 15/2053* (2013.01); *G03G 15/2064* (2013.01); *H05B 3/0095* (2013.01); *H05B 3/03* (2013.01); *H05B 3/10* (2013.01); *H05B 3/20* (2013.01); *H05B 3/262* (2013.01); *H05B 3/265* (2013.01); *H05B 3/46* (2013.01); *H05B 2203/003* (2013.01); *H05B 2203/005* (2013.01); *H05B 2203/016* (2013.01)

(58) Field of Classification Search

CPC ................ H05B 3/46; H05B 2203/003; H05B 2203/005; H05B 3/262; H05B 2203/016; G03G 15/20; G03G 15/2042; G03G 15/2053; G03G 15/2064; G03G 2215/2035

USPC ............ 219/466.1, 203, 522, 528, 542, 549; 338/283

See application file for complete search history.

(56) References Cited

U.S. PATENT DOCUMENTS

| | | | | | |
|---|---|---|---|---|---|
| 4,774,397 | A * | 9/1988 | Grise | H05B 3/36 | 219/544 |
| 5,475,204 | A * | 12/1995 | Giamati | B64D 15/12 | 219/548 |
| 7,211,772 | B2 * | 5/2007 | Carpino, II | H05B 3/342 | 219/532 |
| 7,633,450 | B2 * | 12/2009 | Brittingham | F41H 3/00 | 244/134 D |
| 7,763,833 | B2 * | 7/2010 | Hindel | B64D 15/12 | 219/532 |
| 9,445,457 | B2 * | 9/2016 | Sakakibara | H05B 1/0241 | |
| 10,645,758 | B2 * | 5/2020 | Schaumann | H05B 3/26 | |
| 10,802,431 | B2 * | 10/2020 | Adachi | G03G 15/2039 | |
| 2017/0086259 | A1 | 3/2017 | Du et al. | | |
| 2017/0156178 | A1 * | 6/2017 | Schaumann | H05B 3/283 | |
| 2018/0284664 | A1 * | 10/2018 | Imaizumi | G03G 15/2053 | |

FOREIGN PATENT DOCUMENTS

| | | | | |
|---|---|---|---|---|
| WO | WO-2013073276 | A1 * | 5/2013 | H05B 3/262 |
| WO | WO 2017/090692 | A1 | 6/2017 | |
| WO | WO 2017/131041 | A1 | 8/2017 | |

OTHER PUBLICATIONS

International Search Report issued Jan. 22, 2019 in PCT/JP2018/045179 filed Dec. 7, 2018, 1 page.

Korean Office Action dated Feb. 14, 2024, issued in Korean Patent Application No. 10-2019-7031629 (with English translation).

* cited by examiner (a)

(b)

HEATER, FIXING DEVICE, IMAGE-FORMING DEVICE, AND HEATING DEVICE

CROSS-REFERENCE TO RELATED APPLICATION

The present application is a national stage application of PCT Application No: PCT/JP2018/045179, filed Dec. 7, 2018, which claims priority to Japanese Patent Application No. 2017-236487, filed Dec. 8, 2017. The benefit of priority is claimed to each of the foregoing, and the entire contents of each of the foregoing are incorporated herein by reference.

TECHNICAL FIELD

The present invention relates to a heater, a fixing device, an image-forming device, and a heating device. Specifically, the present invention relates to: a heater including a plurality of heating cells each generating heat by energization; and a fixing device, an image-forming device, and a heating device each including such a heater.

BACKGROUND ART

As a heating means for performing heat treatment on a target object, there has been known a heater including a substrate, and a heating cell that is disposed on the substrate and generates heat by energization. Such a heater can be made thin and compact. For example, such a heater is therefore utilized for fixing applications in a copier, a printer, and the like. Alternatively, such a heater is utilized with the heater incorporated in a dryer for heating and drying an object to be processed, such as a panel. In view of these applications, a heater capable of equalizing temperature distribution in a heating face in such a manner that a plurality of heating cells are electrically arranged in parallel is disclosed in Patent Literatures 1 to 3 listed below.

CITATIONS LIST

Patent Literatures

Patent Literature 1: WO 2013/073276 A1
Patent Literature 2: WO 2017/090692 A1
Patent Literature 3: WO 2017/131041 A1

SUMMARY OF INVENTION

Technical Problems

Patent Literature 1 listed above discloses a heater in which heating cells each of which is formed from an electric resistance heating material having a positive temperature coefficient of resistance and is formed in a serpentine shape are electrically connected in parallel. According to this heater, the respective heating cells are capable of mutually self-heat equalizing temperatures. Therefore, the heater that achieves longitudinal heat equalization can be obtained. In the heater disclosed in Patent Literature 1, moreover, a non-formation part which is a gap between adjoining heating cells and on which no wire is formed is tilted in the longitudinal direction of the heater, so that an influence of heat drop caused by the non-formation part can be suppressed in a sweep direction.

However, although the heat equalization by the heater disclosed in Patent Literature 1 is capable of preventing an excessive temperature rise at a certain heating cell, the heat equalizing property between adjacent heating cells has recently been required at a considerably higher level. In addition, a heater that is extremely narrower in a sweep direction is desired. Consequently, there is a high possibility that a situation in which it is difficult to suppress the influence of heat drop caused by the non-formation part in the sweep direction may arise even when the heater disclosed in Patent Literature 1 is simply cut so as to become narrower in the sweep direction.

In view of this, the inventors of this application have proposed, in Patent Literature 2 listed above, a heater that enables dispersion of a gap between heating cells in such a manner that intricate patterns of adjacent heating cells are arranged. The inventors of this application have also proposed, in Patent Literature 3 listed above, a heater that disperses heat generated from a heating cell, via a heat equalizing layer with high heat conductivity, thereby suppressing heat drop caused by a gap between heating cells. However, some heaters are difficult to adopt these configurations. For this reason, various configurations for heat equalization that can be utilized in a variety of combinations have been required.

The present invention has been devised in view of the problems described above and aims at providing a heater having an excellent heat equalizing property even when being narrow in a sweep direction. The present invention also aims at providing a fixing device, an image-forming device, and a heating device each including such a heater.

Solutions to Problems

The present invention is as follows.

[1] The gist of a heater according to claim 1 is a heater for heating an object to be heated in such a manner that at least one of the object to be heated and the heater is swept with the heater disposed opposite the object to be heated, the heater comprising:

a base having a rectangular shape; and a plurality of heating cells (C) each independently receiving power supply, the heating cells (C) being disposed on the base and arranged in a longitudinal direction of the base, wherein each of the heating cells (C) includes a plurality of lateral wires ($L_1$) extending in substantially parallel with the longitudinal direction of the base, and a plurality of oblique wires ($L_3$) tilted relative to the lateral wires ($L_1$), the lateral wires ($L_1$) and the oblique wires ($L_3$) are connected to form a serpentine shape as a whole, each of the heating cells (C) further includes a first folded part ($D_1$) where a corresponding one of the lateral wires ($L_1$) and a corresponding one of the oblique wires ($L_3$) are folded at an obtuse angle, and in the first folded part ($D_1$), the lateral wire ($L_1$) is connected to the oblique wire ($L_3$) via an inversely oblique wire ($L_2$) forming an acute angle or a right angle with respect to the oblique wire ($L_3$).

[2] The gist of a heater according to claim 2 is the heater according to claim 1, wherein each of the heating cells (C) includes a second folded part ($D_2$) where a corresponding one of the lateral wires ($L_1$) and a corresponding one of the oblique wires ($L_3$)

are folded at an acute angle, the second folded part ($D_2$) being juxtaposed to the first folded part ($D_1$), and the second folded part ($D_2$) is chamfered in correspondence with the inversely oblique wire ($L_2$).

[3] The gist of a heater according to claim 3 is the heater according to claim 1, wherein each of the heating cells (C) includes a third folded part ($D_3$) where a corresponding one of the lateral wires ($L_1$) and a corresponding one of the oblique wires ($L_3$) are folded at an obtuse angle, the third folded part ($D_3$) being juxtaposed to the first folded part ($D_1$), and the oblique wire ($L_3$) constituting the third folded part ($D_3$) and the inversely oblique wire ($L_2$) constituting the first folded part ($D_1$) extend in substantially parallel with each other.

[4] The gist of a heater according to claim 4 is the heater according to claim 2, wherein the heating cells (C) comprise a first heating cell (C1) and a second heating cell (C2) adjoining each other in the longitudinal direction, each of the first heating cell (C1) and the second heating cell (C2) includes the first folded part ($D_1$) and the second folded part ($D_2$), and the first folded part ($D_{11}$) of the first heating cell (C1), the second folded part ($D_{21}$) of the first heating cell (C1), the first folded part ($D_{12}$) of the second heating cell (C2), and the second folded part ($D_{22}$) of the second heating cell (C2) are connected to form an imaginary quadrilateral where the first folded part ($D_{11}$) is diagonally opposite to the first folded part ($D_{12}$), and the second folded part ($D_{21}$) is diagonally opposite to the second folded part ($D_{22}$).

[5] The gist of a heater according to claim 5 is the heater according to claim 3, wherein the heating cells (C) comprise a first heating cell (C1) and a second heating cell (C2) adjoining each other in the longitudinal direction, each of the first heating cell (C1) and the second heating cell (C2) includes the first folded part ($D_1$) and the third folded part ($D_3$), and the first folded part ($D_{11}$) of the first heating cell (C1), the third folded part ($D_{31}$) of the first heating cell (C1), the first folded part ($D_{12}$) of the second heating cell (C2), and the third folded part ($D_{32}$) of the second heating cell (C2) are connected to form an imaginary quadrilateral where the first folded part ($D_{11}$) is diagonally opposite to the first folded part ($D_{12}$), and the third folded part ($D_{31}$) is diagonally opposite to the third folded part ($D_{32}$).

[6] The gist of a heater according to claim 6 is a heater for heating an object to be heated in such a manner that at least one of the object to be heated and the heater is swept with the heater disposed opposite the object to be heated, the heater comprising:

a base having a rectangular shape; and a plurality of heating cells (C) each independently receiving power supply, the heating cells (C) being disposed on the base and arranged in a longitudinal direction of the base, wherein each of the heating cells (C) includes a plurality of lateral wires ($L_1$) extending in substantially parallel with the longitudinal direction of the base, and a plurality of oblique wires ($L_3$) tilted relative to the lateral wires ($L_1$), the lateral wires ($L_1$) and the oblique wires ($L_3$) are connected to form a serpentine shape as a whole, an insulation gap (I) is interposed between adjoining two of the heating cells (C) so as to meander between the two heating cells (C), and the insulation gap (I) is tilted to one side in the longitudinal direction as a whole.

[7] The gist of a heater according to claim 7 is the heater according to claim 6, wherein the insulation gap (I) includes:

a plurality of first gaps located between the oblique wires ($L_3$) of the first and second heating cells (C1, C2) adjoining each other in the longitudinal direction, the first gaps being equal in tilt angle to the oblique wires ($L_3$); and a plurality of second gaps tilted oppositely to the first gaps, the second gaps being shorter in path length than the first gaps, and the insulation gap (I) includes either a continuous part of the first gap, second gap, and first gap arranged continuously in this order, or a continuous part of the second gap, first gap, and second gap arranged continuously in this order.

[8] The gist of a heater according to claim 8 is the heater according to claim 6 or 7, wherein an angle ($\theta_{Z1}$) formed by each first gap with respect to a sweep direction is different from an angle ($\theta_{Z2}$) formed by each second gap with respect to the sweep direction.

[9] The gist of a fixing device according to claim 9 is a fixing device comprising the heater according to any of claims 1 to 8.

[10] The gist of an image-forming device according to claim 10 is an image-forming device comprising the heater according to any of claims 1 to 8.

[11] The gist of a heating device according to claim 11 is a heating device comprising the heater according to any of claims 1 to 8.

Advantageous Effects of Invention

A heater according to the first invention can be made excellent in heat equalizing property even when being narrow in a sweep direction.

Specifically, the heater according to the first invention includes a first folded part ($D_1$) where a lateral wire ($L_1$) is connected to an oblique wire ($L_3$) via an inversely oblique wire ($L_2$). A heating pattern thus formed is projected toward another lateral wire ($L_1$) adjacent thereto. It is therefore possible to fill in a thermal space formed due to a folded part including an oblique wire ($L_3$). It is thus possible to realize an excellent heat equalizing property even in a heater that is narrow in a sweep direction.

A heating cell (C) includes a second folded part ($D_2$) juxtaposed to a first folded part ($D_1$) and chamfered in correspondence with an inversely oblique wire ($L_2$). In this case, it is possible to obtain a thermal fill by the first folded part ($D_1$) adjacent to the second folded part ($D_2$). It is therefore possible to fill in a thermal space formed in such a manner that a lateral wire ($L_1$) and an oblique wire ($L_3$) are folded at an acute angle. It is thus possible to realize an excellent heat equalizing property even in a heater that is narrow in a sweep direction.

A heating cell (C) includes a third folded part ($D_3$) juxtaposed to a first folded part ($D_1$) and including an oblique wire ($L_3$) extending in substantially parallel with an inversely oblique wire ($L_2$). In this case, it is possible to obtain a thermal fill by the first folded part ($D_1$) adjacent to the third folded part ($D_3$). It is therefore possible to fill in a thermal space formed due to the oblique wire ($L_3$). It is thus possible to realize an excellent heat equalizing property even in a heater that is narrow in a sweep direction.

A first heating cell (C1) and a second heating cell (C2) are disposed such that first folded parts ($D_1$) are diagonally opposite to each other and second folded parts ($D_2$) are diagonally opposite to each other. In this case, it is possible to effectively fill in a thermal space formed due to the opposite second folded parts ($D_2$), with the opposite first folded parts ($D_1$). It is thus possible to realize an excellent heat equalizing property even in a heater that is narrow in a sweep direction.

A first heating cell (C1) and a second heating cell (C2) are disposed such that first folded parts ($D_1$) are diagonally opposite to each other and third folded parts ($D_3$) are diagonally opposite to each other. In this case, it is possible to effectively fill in a thermal space formed due to the opposite third folded parts ($D_3$), with the opposite first folded parts ($D_1$). It is thus possible to realize an excellent heat equalizing property even in a heater that is narrow in a sweep direction.

A heater according to the second invention can be made excellent in heat equalizing property even when being narrow in a sweep direction.

Specifically, an insulation gap (I) is interposed between two heating cells (C) adjoining each other, so as to meander between the heating cells (C). The insulation gap (I) is tilted to one side in a longitudinal direction as a whole. It is thus possible to bring a second folded part ($D_2$), where a lateral wire ($L_1$) and an oblique wire ($L_3$) are folded at an acute angle, of one of the heating cells (C) close to a second folded part ($D_2$), where a lateral wire ($L_1$) and an oblique wire ($L_3$) are folded at an acute angle, of the other heating cell (C). It is therefore possible to fill in a thermal space formed due to a folded part including an oblique wire ($L_3$), by bringing second folded parts ($D_2$) close to each other. It is thus possible to realize an excellent heat equalizing property even in a heater that is narrow in a sweep direction.

An insulation gap (I) includes first gaps and second gaps shorter in path length than the first gaps, and also includes either a continuous part of the first gap, second gap, and first gap arranged continuously in this order or a continuous part of the second gap, first gap, and second gap arranged continuously in this order. In this case, it is possible to tilt the entire insulation gap (I) by a difference in path length between the first gaps and the second gaps.

An angle ($\theta_{Z1}$) formed by a first gap with respect to a sweep direction is different from an angle ($\theta_{Z2}$) formed by a second gap with respect to the sweep direction. In this case, it is possible to tilt an entire insulation gap (I) by a difference between the angle ($\theta_{Z1}$) and the angle ($\theta_{Z2}$).

DESCRIPTION OF EMBODIMENTS

Hereinafter, the present invention will be described in detail with reference to the drawings.

It should be noted that in the present specification, an angle between wires refers to an angle which two wires form with each other, and does not specify that a folded part actually has a shape folded inward at an acute angle or an obtuse angle or that a folded part actually has a shape folded outward at an acute angle or an obtuse angle.

[1] Heater According to the First Invention

A heater (1) according to the first invention is a heater for heating an object to be heated in such a manner that at least one of the object to be heated and the heater is swept with the heater disposed opposite the object to be heated.

In addition, the heater (1) includes a base (2) having a rectangular shape, and a plurality of heating cells (C) each independently receiving power supply, the heating cells (C) being disposed on the base (2) and arranged in a longitudinal direction ($T_2$) of the base (2).

Each of the heating cells (C) includes a plurality of lateral wires ($L_1$) extending in substantially parallel with the longitudinal direction of the base (2), and a plurality of oblique wires ($L_3$) tilted relative to the lateral wires ($L_1$), and the lateral wires ($L_1$) and the oblique wires ($L_3$) are connected to form a serpentine shape as a whole.

Each of the heating cells (C) further includes a first folded part ($D_1$) where a corresponding one of the lateral wires ($L_1$)

and a corresponding one of the oblique wires ($L_3$) are folded at an obtuse angle, and in the first folded part ($D_1$), the lateral wire ($L_1$) is connected to the oblique wire ($L_3$) via an inversely oblique wire ($L_2$) forming an acute angle or a right angle with respect to the oblique wire ($L_3$) (see FIGS. 1 to 11).

As described above, when a high TCR material (a material with a high temperature coefficient of resistance) is selected as a wire material for a heating cell, a resistivity to be obtained from the material solely is reduced. In order to gain a practical resistance value for a heater, therefore, a wire width is made narrow, and a wire length is made long. There are various shapes for making a wire width narrow and making a wire length long. As one of the shapes, a serpentine shape can be selected.

Figure 12:
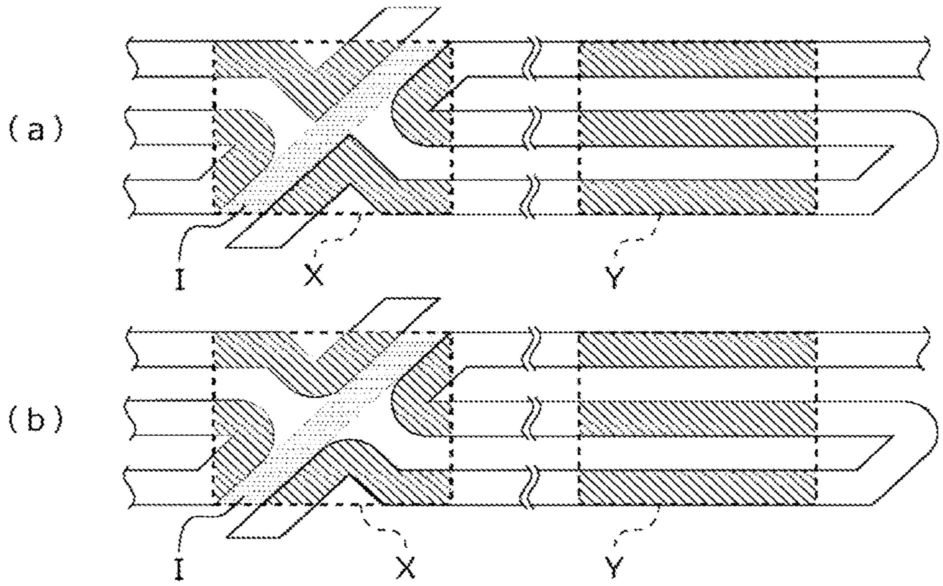
FIG. 12(*a*) is an explanatory view that illustrates an actual wire region, and FIG. 12(*b*) is an explanatory view that illustrates an actual heat generation region.

In order to select a serpentine shape and to form a plurality of heating cells electrically arranged in parallel (i.e., a plurality of heating cells each independently receiving power supply), it is necessary to form an insulation gap I between heating cells (see FIGS. 12(*a*) to 14). This insulation gap I is susceptible to an influence of a shape of a connection wire connecting lateral wires $L_1$ to each other. Specifically, when a longitudinal wire extending in a sweep direction is selected as the connection wire, the insulation gap is formed in parallel with the sweep direction. Consequently, a thermal space is formed in heating an object to be heated by sweeping one of the heater and the object to be heated.

In this regard, it is possible to realize a heat equalizing property in the sweep direction by adopting, as the connection wire, an oblique wire $L_3$ tilted relative to a lateral wire $L_1$. In other words, it is possible to disperse the thermal space by tilting the insulation gap I relative to the sweep direction. From such a viewpoint, it is possible to form a heating pattern (i.e., a heating cell) that is excellent in heat equalizing property, using an oblique wire $L_3$ although a serpentine shape is adopted.

However, it has been found that it becomes gradually difficult to achieve a satisfactory heat equalizing property when the base 2 is made narrower although a serpentine shape is adopted. In other words, it has been found as a problem that a satisfactorily precise heat equalizing property is less likely to be achieved even when a serpentine shape is adopted as a pattern of a heating cell and an insulation gap I is tilted. The inventors of this application have conducted studies of this problem, and have found the followings. That is, an influence to be exerted due to a shape of a folded part increases as the number of folded parts to be formed in adopting a serpentine shape decreases. In addition, a change in shape of a folded part achieves a higher heat equalizing property with an insulation gap I tilted. The inventors of this application have thus completed the present invention.

Figure 13:
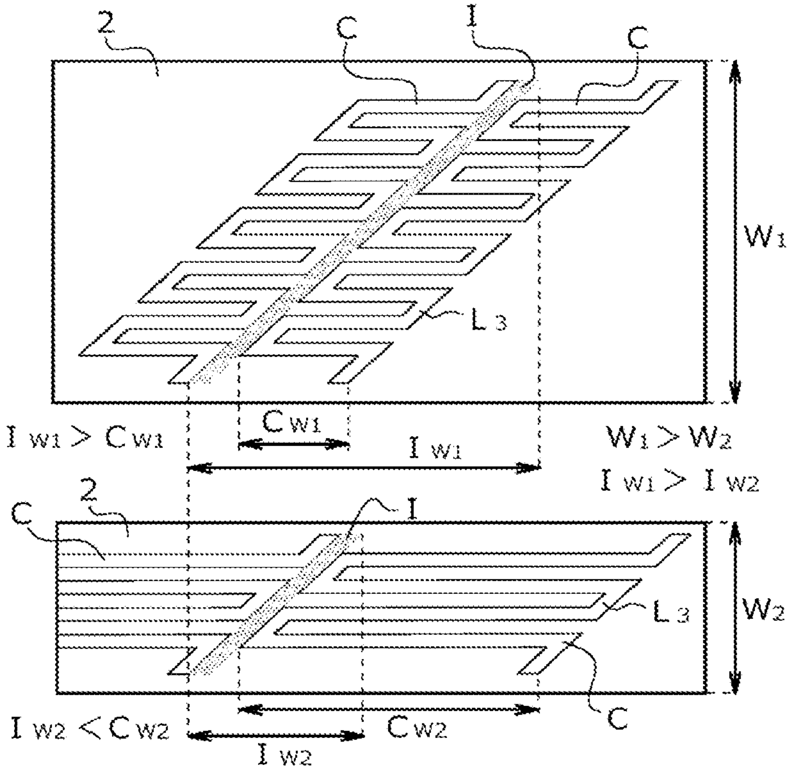
FIG. 13 is an explanatory view that illustrates the action of a base width on an insulation gap I.

Specifically, the foregoing method of dispersing a thermal space by tilting an insulation gap I is effected with ease when the number of folded parts is large in one heating cell. However, if a width W of the base 2 becomes narrower ($W_1 \rightarrow W_2$ in FIG. 13) so that the number of folded parts is decreased, a dispersion range $I_w$ becomes gradually narrower ($I_{W1} \rightarrow I_{W2}$ in FIG. 13). It becomes consequently difficult to disperse the insulation gap I.

In order to secure almost equal wire lengths of the heating cells C such that the heating cells C take almost equal resistance values, it is necessary to elongate a lateral wire of each heating cell in the longitudinal direction, thereby changing the shape of each heating cell such that each heating cell is elongated in the longitudinal direction. As a result, in the case of the base width $W_1$, it is possible to reduce a heating cell width $C_{W1}$ with respect to the dispersion width $I_{W1}$ of the insulation gap I. On the other hand, in the case of the base width $W_2$, it is difficult to reduce a heating cell width $C_{W2}$ with respect to the dispersion width $I_{W2}$ of the insulation gap I. Consequently, the dispersion width $I_{W2}$ becomes smaller than the heating cell width $C_{W2}$, so that a thermal space is dispersed by the insulation gap I only at two ends of each heating cell, which makes it difficult to satisfactorily disperse the insulation gap I (see FIG. 13).

Figure 14:
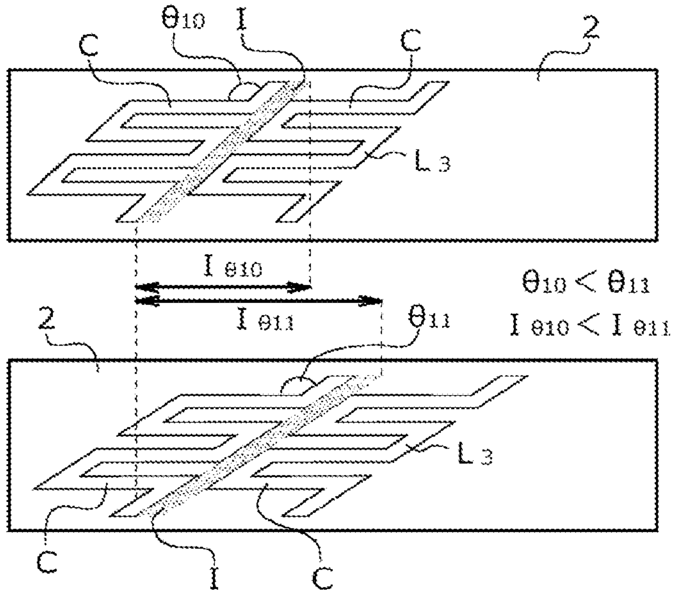
FIG. 14 is an explanatory view that illustrates the action of a tilt angle of an oblique wire on the insulation gap I.

Meanwhile, when an oblique wire $L_3$ is further tilted, that is, when an angle $\theta_{10}$ formed by a lateral wire $L_1$ and the oblique wire $L_3$ is increased to an angle $\theta_{11}$ ($\theta_{10} \rightarrow \theta_{11}$ in FIG. 14), a dispersion range $I_\theta$ of the insulation gap I can be made wider ($I_{\theta 10} \rightarrow I_{\theta 11}$ in FIG. 14).

Figure 15:
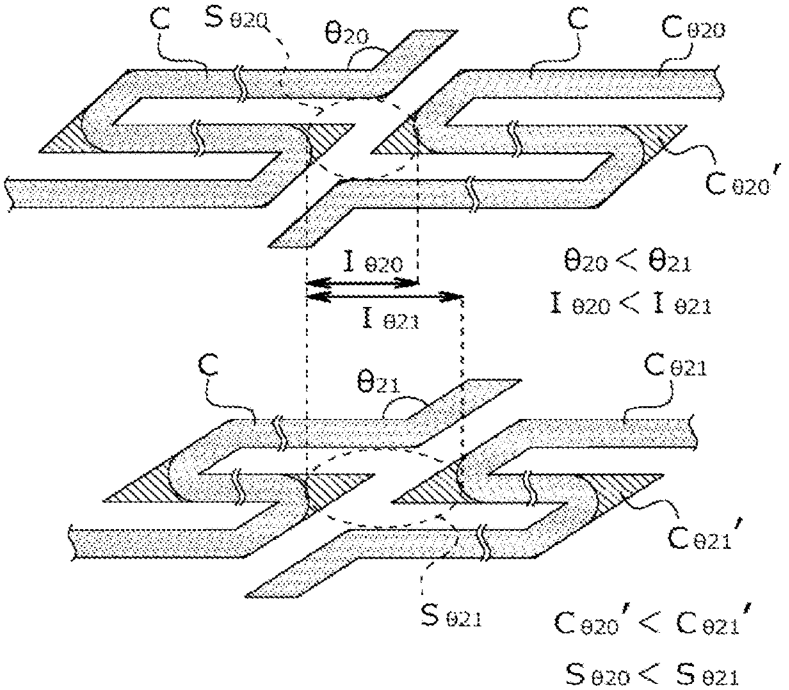
FIG. 15 is an explanatory view that illustrates the action of the tilt angle of the oblique wire on the actual heat generation region.

However, it has been found that when the oblique wire $L_3$ is further tilted ($\theta_{20} \rightarrow \theta_{21}$ in FIG. 15), a thermal space S at a folded part is accordingly increased ($I_{\theta 20} \rightarrow I_{\theta 21}$ in FIG. 15). In other words, it has been found that a thermal space S can be increased beyond the assumption at a folded part that defines a serpentine shape.

It has been considered that this phenomenon is particularly apt to occur at a folded part formed at an acute angle, and a cause thereof results from a fact that an amount of heat generated at an outer peripheral side of the folded part is smaller than that at an inner peripheral side of the folded part since electric current flowing through the folded part tends to flow through an inner side of a wire (takes the shortest route). It has therefore been considered that increasing the tilt angle is advantageous from the viewpoint of dispersing the insulation gap I, but causes considerable reduction in amount of heat at the outer peripheral side of the folded part, and an influence of the reduction in amount of heat at the outer peripheral side of the folded part consequently surpasses the advantage, which makes it difficult to achieve a satisfactory heat equalizing property.

Specifically, in FIG. 15, "C" (an integrated part of $C_{\theta 20}$ with $C_{\theta 20}'$, an integrated part of $C_{\theta 21}$ with $C_{\theta 21}'$) represents a part actually formed from a wire material. Also in FIG. 15, "$C_{\theta 20}$" and "$C_{\theta 21}$" each schematically represent a region where a small amount of heat is directly generated by energization. Also in FIG. 15, "$C_{\theta 20}'$" and "$C_{\theta 21}'$" each schematically represent a region where heat is directly generated by energization.

As illustrated in FIG. 15, when a tilt angle of an oblique wire $L_3$ is increased from $\theta_{20}$ to $\theta_{21}$, the region $C_{\theta 20}$ where the small amount of heat is directly generated is enlarged to $C_{\theta 21}$. As a result, an area of the part where heat is directly generated by energization is reduced from $C_{\theta 20}'$ to $C_{\theta 21}'$ with respect to an actual area of a heating cell. At a position where two heating cells are disposed opposite each other, a size of the thermal space $S_{\theta 20}$ is enlarged to $S_{\theta 21}$.

In view of this, an inversely oblique wire $L_2$ is provided as described above such that a lateral wire $L_1$ and an oblique wire $L_3$ are folded at the inversely oblique wire $L_2$ in a first folded part $D_1$. It is thus possible to form a heating pattern projected toward another lateral wire $L_1$ adjacent to the heating pattern (a projected shape). It is therefore possible to reduce the thermal space S by the heat generation from the inversely oblique wire $L_2$ irrespective of the tilt angle of the oblique wire $L_3$. It is thus possible to provide a heater capable of exhibiting a more excellent heat equalizing property.

[1] Lateral Wire

A lateral wire $L_1$ refers to a wire part disposed in substantially parallel with the longitudinal direction of the base 2. One heating cell C includes at least three lateral wires $L_1$ disposed in substantially parallel with one another. The number of lateral wires $L_1$ in one heating cell C is typically 20 or less, but is not limited thereto. A configuration according to the present invention is effective for a heater in which the number of lateral wires $L_1$ disposed substantially in parallel with one another is small. Specifically, the number of lateral wires $L_1$ in one heating cell C is preferably in a range from three or more to 10 or less, more preferably in a range from three or more to seven or less.

A lateral wire $L_1$ may be shorter than an inversely oblique wire $L_2$ and an oblique wire $L_3$, but is preferably longer than the inversely oblique wire $L_2$ and the oblique wire $L_3$.

The heater 1 also includes the plurality of heating cells C (e.g., a first heating cell C1 and a second heating cell C2). A lateral wire $L_1$ of one heating cell and a lateral wire $L_1$ of another heating cell preferably fall within a single extension range $Q_1$ on condition that these lateral wires $L_1$ extend in the longitudinal direction (see FIG. 8). In other words, the width of the heater 1 in the sweep direction can be reduced in such a manner that corresponding lateral wires $L_1$ (the lateral wires $L_1$ of the respective heating cells at the same stage) are disposed on their longitudinal extensions. Adjacent heating cells may be equal in number of lateral wires $L_1$ to each other. However, all the heating cells are not necessarily equal in number of lateral wires $L_1$ to one another.

[2] Oblique Wire

An oblique wire $L_3$ refers to a wire part tilted relative to a lateral wire $L_1$, and a part connecting lateral wires $L_1$ to each other to form a serpentine shape. The number of oblique wires $L_3$ in one heating cell C is typically two or more, but is not limited thereto. In one heating cell C, when the number of lateral wires $L_1$ is 20 or less, the number of oblique wires $L_3$ is typically 21 or less. Also in one heating cell C, when the number of lateral wires $L_1$ is in a range from three or more to 10 or less, the number of oblique wires $L_3$ may be in a range from two or more to 11 or less. Also in one heating cell C, when the number of lateral wires $L_1$ is in a range from three or more to seven or less, the number of oblique wires $L_3$ may be in a range from two or more to eight or less.

In one heating cell C, a plurality of oblique wires $L_3$ may be different in tilt angle (an angle $\theta_1$ or an angle $\theta_2$ relative to a lateral wire $L_1$) from one another. In one heating cell C, preferably, a plurality of oblique wires $L_3$ are substantially equal in tilt angle (an angle $\theta_1$ or an angle $\theta_2$ relative to a lateral wire $L_1$) to one another. In the heater 1, preferably, the plurality of oblique wires $L_3$ of the plurality of heating cells C are also substantially equal in tilt angle (an angle $\theta_1$ or an angle $\theta_2$ relative to a lateral wire $L_1$) to one another.

Figure 8:
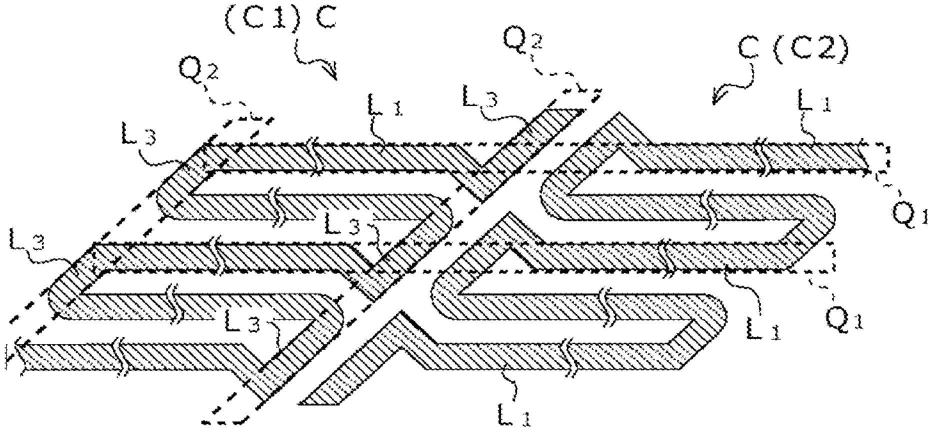
FIG. 8 is an explanatory view that illustrates an oblique wire in a heating cell.
Figure 9:
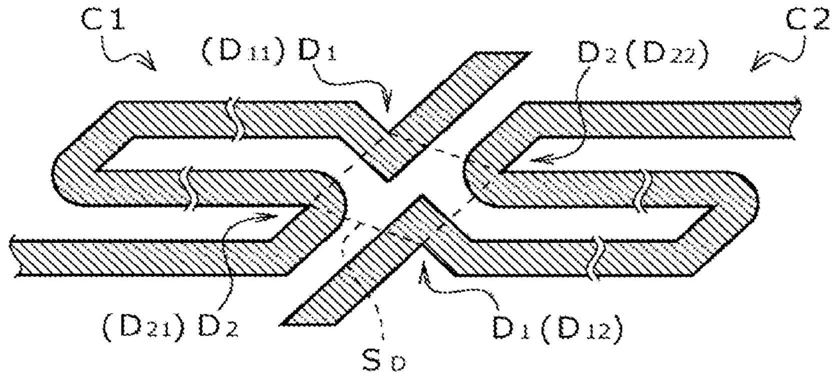
FIG. 9 is a schematic plan view that shows one example of a form of two heating cells disposed opposite each other.
Figure 10:
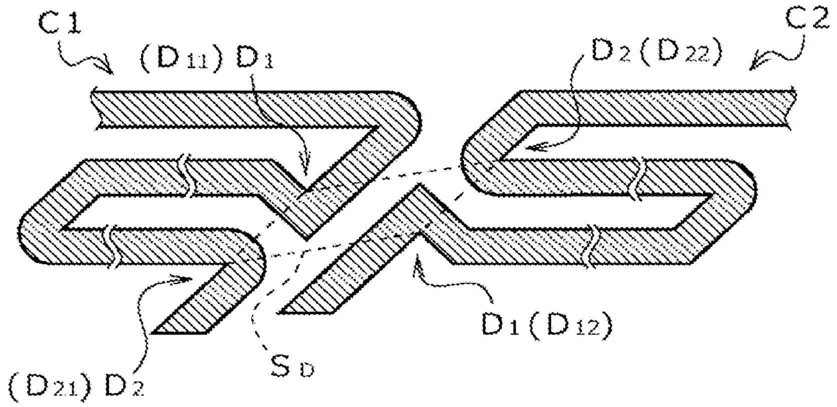
FIG. 10 is a schematic plan view that shows another example of the form of two heating cells disposed opposite each other.

Preferably, oblique wires $L_3$ (excluding an oblique wire $L_3$ in a folded part $D_3$ ($\theta_3$=obtuse angle)) on one end of one heating cell C fall within a single extension range $Q_2$ on condition that these oblique wires $L_3$ extend at an angle formed by the oblique wires $L_3$ (see FIG. 8).

A tilt angle of an oblique wire $L_3$ (i.e., an angle $\theta_1$ formed by a lateral wire $L_1$ and an oblique wire $L_3$ (see FIGS. 3 to 7)) is not limited, and may be set in a range from 91 degrees or more to 179 degrees or less. This tilt angle is preferably in a range from 105 degrees or more to 160 degrees or less, more preferably in a range from 115 degrees or more to 155 degrees or less, still more preferably in a range from 120 degrees or more to 150 degrees or less, particularly preferably in a range from 125 degrees or more to 145 degrees or less. As to these preferable numerical ranges, a more preferable range is capable of suppressing a heat generation loss to be smaller.

An angle $\theta_2$ formed by a lateral wire $L_1$ and an oblique wire $L_3$ (see FIGS. 3, 4, and 6) typically satisfies a relation of $\theta_2=180-\theta_1$. Therefore, as the angle $\theta_1$ increases, the angle $\theta_2$ accordingly decreases.

As illustrated in FIG. 12(*a*), the degree of a heat generation loss can be grasped by a comparison between a range X covering an insulation gap I in the longitudinal direction and a range Y covering only lateral wires $L_1$ (the range Y is equal in longitudinal width to the range X). It can be assumed that the heat generation loss is smaller as a value of $X_1/Y_1$ is larger, in which $X_1$ represents a total area of actual wire regions (hatched parts) in the range X, and $Y_1$ represents a total area of actual wire regions (hatched parts) in the range Y. It is however considered as described above that an amount of heat generated at an outer peripheral side of a folded part is actually smaller than that at an inner peripheral side of the folded part since electric current flowing through the folded part tends to flow through an inner side of a wire (takes the shortest route). As illustrated in FIG. 12(*b*), the comparison can accordingly be made in consideration with this fact as follows. That is, as to a heat generation region in the range X, a region (hatched part) chamfered as illustrated in FIG. 12(*b*) is regarded as an actual heat generation region. In other words, it is assumed that the heat generation loss is smaller as a value of $X_2/Y_2$ is larger, in which $X_2$ represents a total area of actual heat generation regions (hatched parts) in the range X illustrated in FIG. 12(*b*), and $Y_2$ represents a total area of actual heat generation regions (hatched parts) in the range Y.

[3] Inversely Oblique Wire

An inversely oblique wire $L_2$ refers to a wire part in a first folded part $D_1$, and a wire part forming an acute angle or a right angle relative to an oblique wire $L_3$. In the first folded part $D_1$, the oblique wire $L_3$ is connected to a lateral wire $L_1$ at an obtuse angle. Typically, the inversely oblique wire $L_2$ is also connected to the lateral wire $L_1$ at an obtuse angle. An inversely oblique wire $L_2$ also refers to a wire part disposed between a lateral wire $L_1$ and an oblique wire $L_3$. The lateral wire $L_1$, the inversely oblique wire $L_2$, and the oblique wire $L_3$ are therefore connected continuously in this order. The first folded part $D_1$ typically includes one inversely oblique wire $L_2$.

An inversely oblique wire $L_2$ forms an acute angle or a right angle relative to an oblique wire $L_3$; however, this angle is not particularly limited. For example, this angle may be set in a range from 20 degrees or more to 90 degrees or less. In view of this, the angle formed by the oblique wire $L_3$ and the inversely oblique wire $L_2$ is preferably an angle approximate to 90 degrees as much as possible. This angle is more preferably in a range from 45 degrees or more to 90 degrees or less, still more preferably in a range from 60 degrees or more to 90 degrees or less, particularly preferably in a range from 80 degrees or more to 90 degrees or less. A thermal space can typically be reduced as the angle formed by the oblique wire $L_3$ and the inversely oblique wire $L_2$ is approximate to 90 degrees.

In addition, a correlation between the oblique wire $L_3$ and the inversely oblique wire $L_2$ as to a length of a wire part is not limited. The oblique wire $L_3$ may be longer than the inversely oblique wire $L_2$. The oblique wire $L_3$ may be equal to the inversely oblique wire $L_2$. The oblique wire $L_3$ may be shorter than the inversely oblique wire $L_2$. In particular, the oblique wire $L_3$ is preferably longer than the inversely oblique wire $L_2$.

[4] Serpentine Shape

A serpentine shape refers to such a shape that, as to three lateral wires $L_1$, that is, three lateral wires $L_{11}$, $L_{12}$, and $L_{13}$, the lateral wires $L_{11}$ and $L_{12}$ are connected at their first ends to each other, and the lateral wires $L_{12}$ and $L_{13}$ are connected at their second ends to each other. Therefore, a serpentine shape naturally involves, for example, such a shape that, as to three lateral wires $L_1$, that is, three lateral wires $L_{11}$, $L_{12}$, and $L_{13}$, the lateral wires $L_{11}$ and $L_{12}$ are connected at their second ends to each other, and the lateral wires $L_{12}$ and $L_{13}$ are connected at their first ends to each other. A serpentine shape also involves, for example, such a shape that, as to four lateral wires $L_1$, that is, four lateral wires $L_{11}$, $L_{12}$, $L_{13}$, and $L_{14}$, the lateral wires $L_{11}$ and $L_{12}$ are connected at their first ends to each other, the lateral wires $L_{12}$ and $L_{13}$ are connected at their second ends to each other, and the lateral wires $L_{13}$ and $L_{14}$ are connected at their first ends to each other.

As described above, the heater 1 becomes effective in such a manner that a heating cell C has a serpentine shape. By adopting a serpentine shape, a wire length can be increased by a factor of the number of folded parts on the base 2 having the same length in the longitudinal direction. It is therefore possible to increase a resistance value of an electric resistance heating wire. It is thereby possible to obtain an amount of generated heat to be required for a practical heater.

As to a typical metal material for an electric resistance heating wire of a heater, in a case of using, for example, silver (resistivity $p=1.62\times10^{-8}$ Ωm, temperature coefficient $\alpha=4.1\times10^{-3}$/° C. at 20° C.), the temperature coefficient α is high, but the resistivity ρ is low. It is therefore difficult to increase a resistance value. In view of this, palladium ($\rho=10.8\times10^{-8}$ Ωm, $\alpha=3.7\times10^{-3}$/° C.) that is higher in resistivity ρ than silver may be added. However, the temperature coefficient α is decreased although the resistivity ρ is increased. As described above, when a material with high TCR characteristics is selected, the resistivity tends to be decreased. It is therefore necessary to increase a wire length so as to cause an electric resistance heating wire to have high TCR characteristics and a practical resistance value. In this respect, adopting a serpentine shape brings about an advantage of increasing a wire length and increasing a resistance value.

With regard to wires (electric resistance heating wires) that form a serpentine shape of a heating cell C, the wires can be made substantially equal in thickness and width to one another in one heating cell. The wires can also be made substantially equal in thickness and width to one another among different heating cells. As a matter of course, the thicknesses and widths of the wires are changeable in the respective heating cells, for the purpose of appropriately providing a temperature gradient if necessary.

A wire width and a wire-to-wire distance (insulation distance) may be appropriately selected. Specifically, a wire width may be appropriately selected as long as heat generation is possible. Moreover, a wire-to-wire distance is appropriately selected as long as insulation between wires is possible. In view of this, for example, each of the wire width and the wire-to-wire distance may be set in a range from 0.3 mm or more to 2.0 mm or less. Each of the wire width and the wire-to-wire distance may also be set in a range from 0.4 mm or more to 1.2 mm or less.

[5] Folded Part

A heating cell C includes at least one first folded part $D_1$. The heating cell C additionally includes at least one of a second folded part $D_2$ and a third folded part D3. Therefore, one heating cell C may include only a first folded part $D_1$ and a second folded part $D_2$. Alternatively, one heating cell C may include only a first folded part $D_1$ and a third folded part $D_3$. Still alternatively, one heating cell C may include all of a first folded part $D_1$, a second folded part $D_2$, and a third folded part $D_3$.

A first folded part $D_1$ refers to a folded part where a lateral wire $L_1$ is connected to an oblique wire $L_3$ via an inversely oblique wire $L_2$ forming an acute angle or a right angle relative to the oblique wire $L_3$. A first folded part $D_1$ also refers to a folded part where a lateral wire $L_1$ and an oblique wire $L_3$ form an obtuse angle (see FIGS. 1 to 7).

The heater 1 includes a heating cell C having a serpentine shape and including a first folded part $D_1$. The heater 1 thus exhibits an excellent heat equalizing property. In a heating cell C having a serpentine shape, preferably, a larger number of folded parts where lateral wires $L_1$ and oblique wires $L_3$ form an obtuse angle (excluding a third folded part $D_3$) correspond to first folded parts $D_1$. Particularly preferably, all folded parts where lateral wires $L_1$ and oblique wires $L_3$ form an obtuse angle (excluding a third folded part $D_3$) correspond to first folded parts $D_1$.

An obtuse angle $\theta_1$ (see FIGS. 1 to 7) formed by a lateral wire $L_1$ and an oblique wire $L_3$ each constituting a first folded part $D_1$ is not limited. As described above, the obtuse angle $\theta_1$ is preferably in a range from 105 degrees or more to 160 degrees or less, more preferably in a range from 115 degrees or more to 155 degrees or less, still more preferably in a range from 120 degrees or more to 150 degrees or less, particularly preferably in a range from 125 degrees or more to 145 degrees or less. As to these preferable numerical ranges, a more preferable range is capable of suppressing a heat generation loss to be smaller.

In addition, an angle formed by an oblique wire $L_3$ and an inversely oblique wire $L_2$ each constituting a first folded part $D_1$ is not limited as long as it is an acute angle or a right angle. For example, this angle may be in a range from 20 degrees or more to 90 degrees or less, preferably in a range from 45 degrees or more to 90 degrees or less, more preferably in a range from 60 degrees or more to 90 degrees or less, still more preferably in a range from 80 degrees or more to 90 degrees or less. A thermal space can be reduced as this angle is approximate to 90 degrees.

Figure 1:
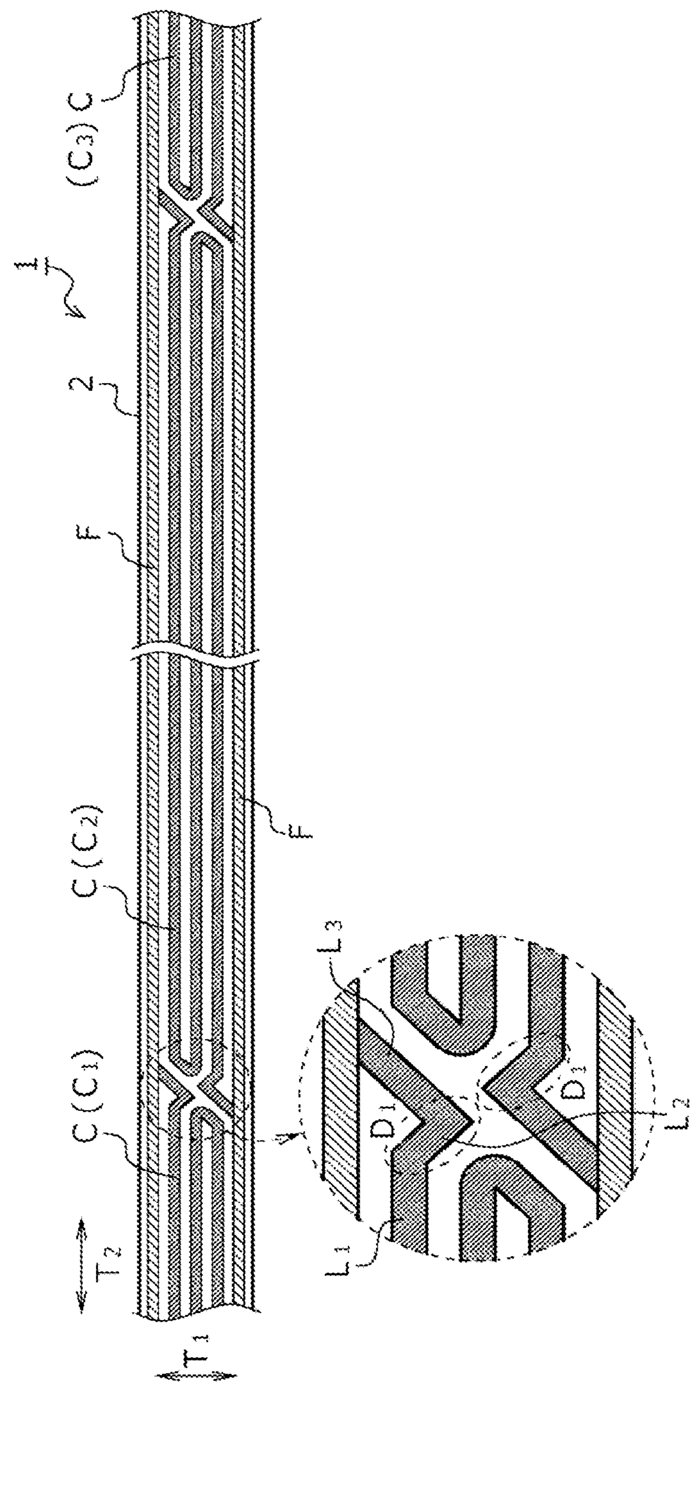
FIG. 1 is a schematic plan view that shows one example of a heater.
Figure 2:
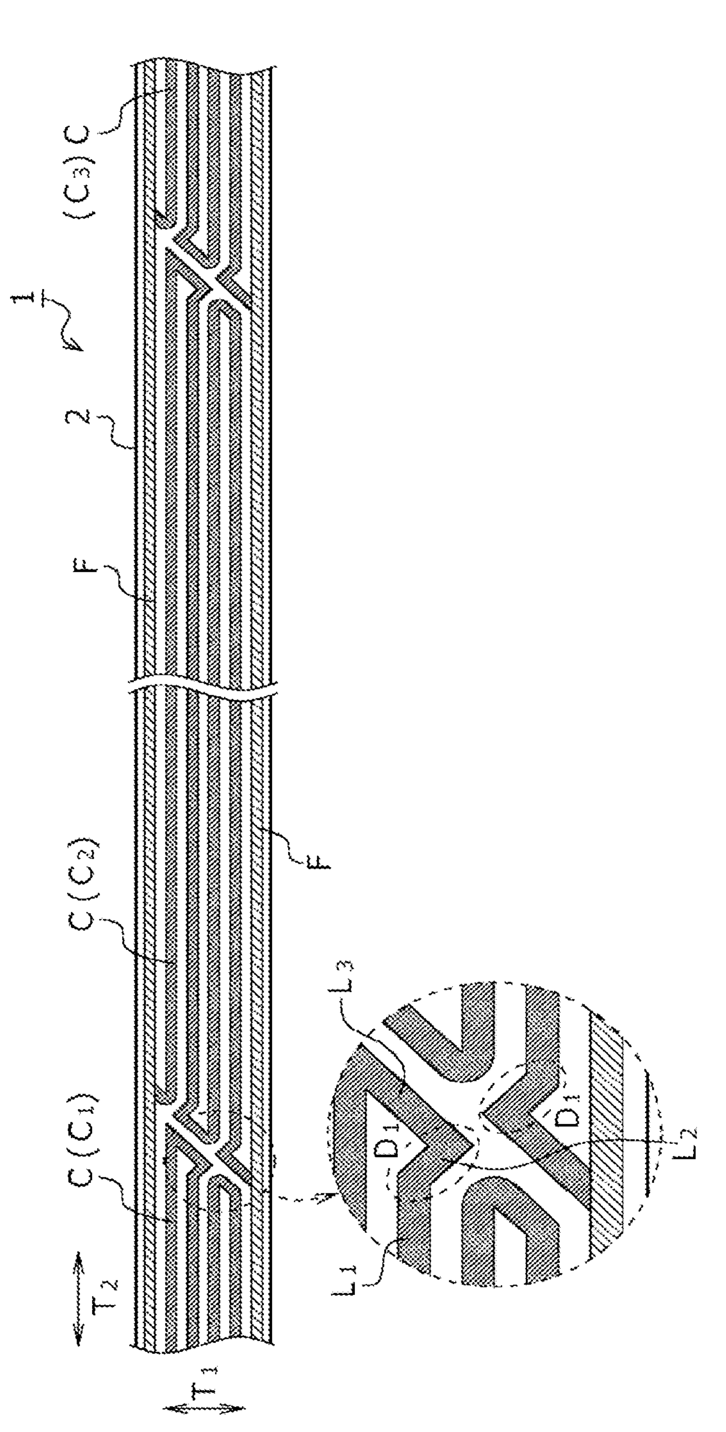
FIG. 2 is a schematic plan view that shows another example of the heater.
Figure 3:
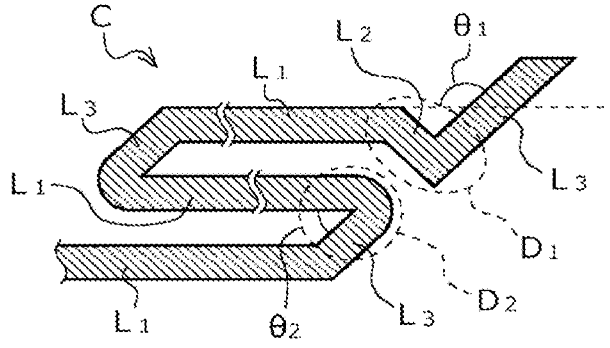
FIG. 3 is a schematic plan view that shows one example of a heating cell.
Figure 4:
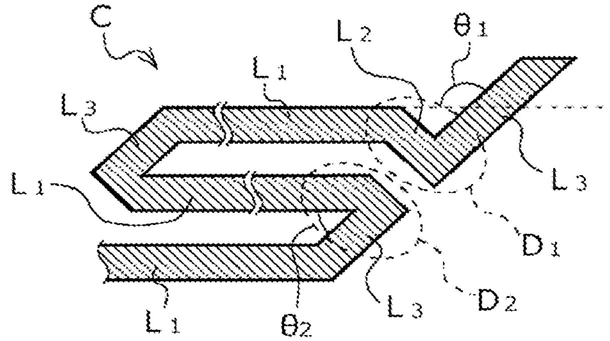
FIG. 4 is a schematic plan view that shows another example of the heating cell.
Figure 5:
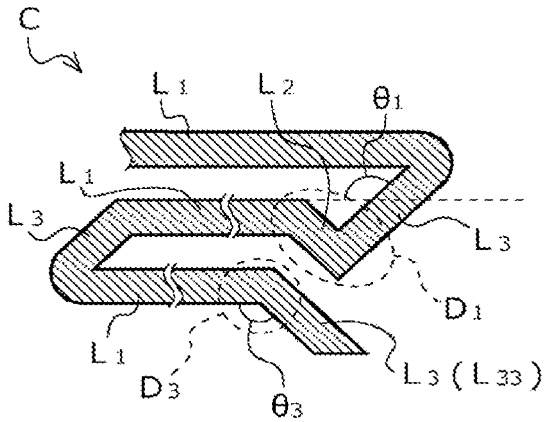
FIG. 5 is a schematic plan view that shows still another example of the heating cell.
Figure 6:
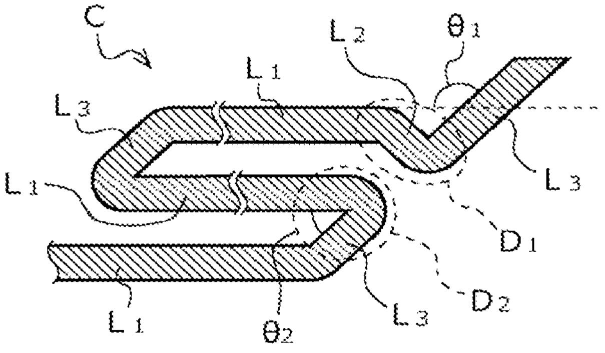
FIG. 6 is a schematic plan view that shows yet another example of the heating cell.
Figure 7:
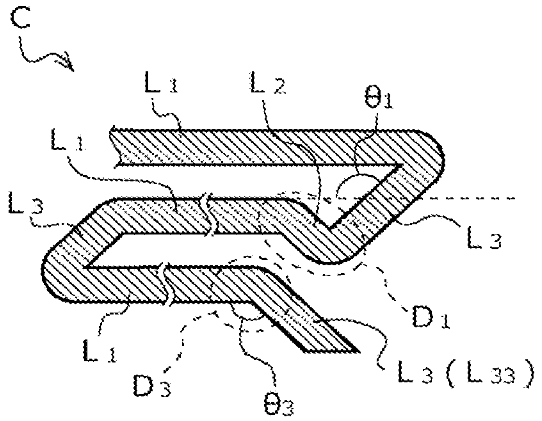
FIG. 7 is a schematic plan view that shows yet another example of the heating cell.

As illustrated in FIGS. 6 and 7, an outer periphery of a first folded part $D_1$ may be chamfered. Likewise, an inner periphery of a first folded part $D_1$ may be chamfered. A method of chamfering a first folded part $D_1$ is not limited. For example, the first folded part $D_1$ may be chamfered in a round shape (see FIGS. 6 and 7) or may be chamfered in a flat shape.

A second folded part $D_2$ refers to a folded part juxtaposed to a first folded part $D_1$. A second folded part $D_2$ also refers to a folded part where a lateral wire $L_1$ and an oblique wire $L_3$ are folded at an acute angle. A second folded part $D_2$ also refers to a folded part chamfered in correspondence with an inversely oblique wire $L_2$ constituting a first folded part $D_1$ (i.e., a folded part where an outer periphery of a second folded part $D_2$ is chamfered).

An acute angle $\theta_2$ (see FIGS. 3, 4, and 6) formed by a lateral wire $L_1$ and an oblique wire $L_3$ each constituting a second folded part $D_2$ is not limited. The acute angle $\theta_2$ is preferably in a range from 15 degrees or more to 70 degrees or less, more preferably in a range from 25 degrees or more to 65 degrees or less, still more preferably in a range from 30 degrees or more to 60 degrees or less, particularly preferably in a range from 35 degrees or more to 55 degrees or less. In the ranges described above, preferably, an oblique wire $L_3$ constituting a second folded part $D_2$ is aligned with an oblique wire $L_3$ constituting a first folded part $D_1$.

A method of chamfering a second folded part $D_2$ is not limited. A second folded part $D_2$ may be chamfered such that an insulation from an inversely oblique wire $L_2$ can be ensured. Specifically, for example, a second folded part $D_2$ may be chamfered in a round shape (see FIGS. 3 and 6) or may be chamfered in a flat shape (see FIG. 4). In a case where wires of a heating cell C are substantially equal in width to one another, in chamfering a second folded part $D_2$ in a round shape, for example, the second folded part $D_2$ may be chamfered in a circular shape corresponding to the wire width with the inner vertex of the second folded part $D_2$ defined as a center (see FIGS. 3 and 6). Also in a case where wires of a heating cell C are substantially equal in width to one another, in chamfering a second folded part $D_2$ in a flat shape, for example, the second folded part $D_2$ may be formed in a such shape that an outer periphery of the second folded part $D_2$ is cut to become parallel with an inversely oblique wire $L_2$ constituting a first folded part $D_1$ (see FIG. 4).

In a second folded part $D_2$ forming an acute angle, as described above, an amount of heat generated at an inner side of the second folded part $D_2$ is larger than that at an outer side of the second folded part $D_2$ since electric current flowing through the second folded part $D_2$ tends to flow through an inner side of an electric resistance heating wire (takes the shortest route). In addition, an electric resistance heating wire contains metal, and is therefore higher in heat conductivity than a material, such as insulating glass, for another layer. Accordingly, an electric resistance heating wire can be provided for transmitting heat generated at an inner side of a second folded part $D_2$ to an outer side of the second folded part $D_2$ by heat conduction. However, it has been found that, even in a case where an electric resistance heating wire is located on an outer side of a second folded part $D_2$, it is actually unsatisfactory to transmit heat generated at an inner side of the second folded part $D_2$ to the outer side by heat conduction, thereby achieving action of compensating a thermal space. In view of this, an outer side of a second folded part $D_2$ is chamfered, and a space defined by this chamfering is utilized to form an inversely oblique wire $L_2$ constituting a first folded part $D_1$ as described above. In addition, the first folded part $D_1$ is projected toward the second folded part $D_2$. It is thus possible to effectively reduce a thermal space. In other words, it is possible to achieve a more excellent heat equalizing property. Likewise, an inner periphery of the second folded part $D_2$ may also be chamfered.

A third folded part $D_3$ refers to a folded part juxtaposed to a first folded part $D_1$. A third folded part $D_3$ also refers to a folded part where a lateral wire $L_1$ and an oblique wire $L_{33}$ are folded at an obtuse angle. A third folded part $D_3$ also refers to a folded part where an oblique wire $L_{33}$ constituting the third folded part $D_3$ and an inversely oblique wire $L_2$ constituting a first folded part $D_1$ extend in substantially parallel with each other. The oblique wire $L_{33}$ constituting the third folded part $D_3$ can particularly be utilized as a power supply connection wire for connecting a power supply wire F that supplies power to each heating cell C to a heating cell C.

An obtuse angle $\theta_3$ (see FIGS. 5 and 7) formed by a lateral wire $L_1$ and an oblique wire $L_{33}$ each constituting a third folded part $D_3$ is not limited. The obtuse angle $\theta_3$ is preferably in a range from 105 degrees or more to 160 degrees or less, more preferably in a range from 115 degrees or more to 155 degrees or less, still more preferably in a range from 120 degrees or more to 150 degrees or less, particularly preferably in a range from 125 degrees or more to 145 degrees or less. As to these preferable numerical ranges, a more preferable range is capable of suppressing a heat generation loss to be smaller. In the ranges described above, preferably, the obtuse angle $\theta_3$ is equal to an obtuse angle $\theta_1$ formed by a first folded part $D_1$. It should be noted that an outer periphery and/or an inner periphery of a third folded part $D_3$ may be chamfered.

[6] Arrangement of Folded Parts

In the heater 1, the folded parts in the respective heating cells C may be disposed in any arrangement. In a case where a first heating cell C1 and a second heating cell C2 each include a first folded part $D_1$ and a second folded part $D_2$, the first folded parts $D_1$ and the second folded parts $D_2$ are disposed in a predetermined arrangement illustrated in FIG. 9 or a predetermined arrangement illustrated in FIG. 10, which leads to further reduction in thermal space.

Specifically, the heating cells C include a first heating cell C1 and a second heating cell C2 adjoining each other in the longitudinal direction of the base, and each of the first heating cell C1 and the second heating cell C2 includes a first folded part $D_1$ and a second folded part $D_2$. In this case, preferably, the first folded part $D_{11}$ of the first heating cell C1, the second folded part $D_{21}$ of the first heating cell C1, the first folded part $D_{12}$ of the second heating cell C2, and the second folded part $D_{22}$ of the second heating cell C2 are connected to form an imaginary quadrilateral $S_D$ where the first folded part $D_{11}$ is diagonally opposite to the first folded part $D_{12}$, and the second folded part $D_{21}$ is diagonally opposite to the second folded part $D_{22}$. Adopting this form enables more remarkable reduction in thermal space as compared with a case where a heating cell C including a first folded part $D_1$ and a second folded part $D_2$ is utilized solely. In other words, it is possible to provide a heater having a particularly excellent heat equalizing property.

Figure 11:
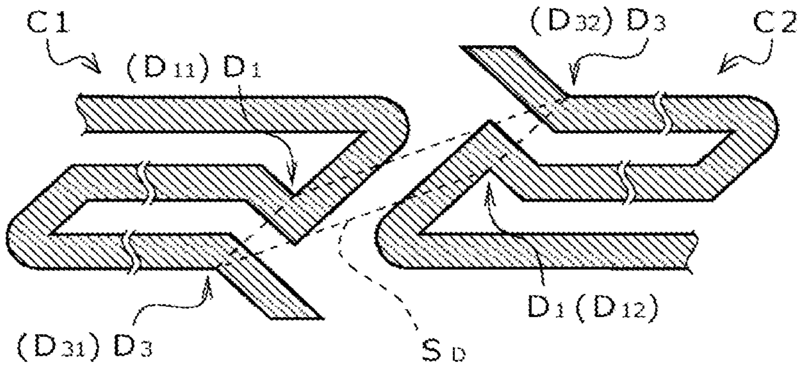
FIG. 11 is a schematic plan view that shows still another example of the form of two heating cells disposed opposite each other.

In a case where a first heating cell C1 and a second heating cell C2 each include a first folded part $D_1$ and a third folded part $D_3$, the first folded part $D_1$ and the third folded part $D_3$ are disposed in a predetermined arrangement illustrated in FIG. 11, which leads to further reduction in thermal space.

Specifically, the heating cells C include a first heating cell C1 and a second heating cell C2 adjoining each other in the longitudinal direction of the base, and each of the first heating cell C1 and the second heating cell C2 includes a first folded part $D_1$ and a third folded part $D_3$. In this case, preferably, the first folded part $D_{11}$ of the first heating cell C1, the third folded part $D_{31}$ of the first heating cell C1, the first folded part $D_{12}$ of the second heating cell C2, and the third folded part $D_{32}$ of the second heating cell C2 are connected to form an imaginary quadrilateral $S_D$ where the first folded part $D_{11}$ is diagonally opposite to the first folded part $D_{12}$, and the third folded part $D_{31}$ is diagonally opposite to the third folded part $D_{32}$. Adopting this form enables more remarkable reduction in thermal space as compared with a case where a heating cell C including a first folded part $D_1$ and a third folded part $D_3$ is utilized solely. In other words, it is possible to provide a heater having a particularly excellent heat equalizing property.

[7] Electric Resistance Heating Wire

A wire material constituting a heating cell C is an electric resistance heating wire, and is an electrically conductive material. Specifically, the wire material is an electrically conductive material that enables heat generation according to a resistance value by energization. This electrically conductive material is not limited, and examples thereof may include silver, copper, gold, platinum, palladium, rhodium, tungsten, molybdenum, rhenium (Re), ruthenium (Ru), and the like. One kind of these materials may be used solely.

Alternatively, two or more kinds of these materials may be used in combination. In the case of using two or more kinds of the electrically conductive materials in combination, the electrically conductive materials can be used in the form of an alloy. More specifically, examples of such an alloy may include a silver-palladium alloy, a silver-platinum alloy, a platinum-rhodium alloy, a silver-ruthenium, silver, copper, gold, and the like.

Each heating cell may have any electric resistance heating characteristic. Preferably, each heating cell is capable of exerting self-temperature balancing action (self-temperature complementing action) among the heating cells. From this viewpoint, an electrically conductive material for an electric resistance heating wire preferably has a positive temperature coefficient of resistance. Specifically, a temperature coefficient of resistance in a temperature range from −200° C. or more to 1000° C. or less is preferably in a range from 100 ppm/° C. or more to 4400 ppm/° C. or less, more preferably in a range from 300 ppm/° C. or more to 3700 ppm/° C. or less, particularly preferably in a range from 500 ppm/° C. or more to 3000 ppm/° C. or less. Examples of such a material may include silver alloys such as a silver-palladium alloy.

In a case where electric resistance heating wires (i.e., heating cells) each made of an electrically conductive material having a positive temperature coefficient of resistance are electrically connected in parallel, these heating cells mutually exert self-temperature balancing action. Specifically, for example, in a case where a second heating cell is disposed between a first heating cell and a third heating cell, if a temperature of the second heating cell decreases, heat from each of the first heating cell and the third heating cell compensates for the temperature drop. As a result of such a thermal fill, an amount of electric current to be fed to the first heating cell and third heating cell whose temperatures have decreased is then increased to exert action of autonomously recovering a temperature drop caused by the heat thus lost. In other words, the heating cells around the second heating cell act so as to complement the temperature drop in the second heating cell. The heater 1 is thus capable of autonomously controlling the plurality of heating cells such that the heating cells generate heat uniformly.

[8] Base

The base 2 is a substrate supporting a heating cell C.

The size and shape of the base 2 are not particularly limited. However, a base having a length in a direction (longitudinal direction) $T_2$ perpendicular to a sweep direction $T_1$ being longer than a length in the sweep direction $T_1$ is more likely to produce advantageous effects by the configuration according to the present invention. Specifically, a ratio ($L_{H1}/L_{H2}$) between the length $L_{H1}$ of the base 2 in the sweep direction and the length $L_{H2}$ of the base 2 in the direction perpendicular to the sweep direction may be set in a range from 0.001 or more to 0.25 or less. The ratio is preferably in a range from 0.005 or more to 0.2 or less, more preferably in a range from 0.01 or more to 0.15 or less. The thickness of the base 2 may be set in a range from 0.1 to 20 mm in accordance with, for example, the material, size, and the like of the base. More specifically, the length $L_{H1}$ may be set in a range from 3 mm or more to 20 mm or less. The length $L_{111}$ may also be set in a range from 5 mm or more to 15 mm or less.

A material for the base 2 is not limited as long as it causes a heating cell to generate heat. Examples of the material for the base may include metal, ceramic, a composite material thereof, and the like. In a case where the base is formed of an electrically conductive member such as metal, the base may have a configuration in which an insulating layer is provided on the electrically conductive member. In this case, a heating cell is formed on the insulating layer.

Examples of metal that forms the base 2 may include steel and the like. In particular, stainless steel may be preferably used. The kind of stainless steel is not particularly limited, and ferrite stainless steel and/or austenite stainless steel are/is preferably used. Of these kinds of stainless steel, stainless steel that is particularly excellent in heat resistance and/or oxidation resistance is preferably used. Examples thereof may include SUS430, SUS436, SUS444, SUS316L, and the like. One kind of these materials may be used solely. Alternatively, two or more kinds of these materials may be used in combination.

Examples of metal that forms the base may also include aluminum, magnesium, copper, and an alloy of these metals. One kind of these materials may be used solely. Alternatively, two or more kinds of these materials may be used in combination. In particular, since aluminum, magnesium, and an alloy thereof (e.g., an aluminum alloy, a magnesium alloy, an Al—Mg alloy) each have a lower specific gravity, employing these metals achieves a reduction in weight of the heater according to the first invention. Moreover, since copper and an alloy thereof are excellent in heat conductivity, employing these metals achieves improvement in heat equalizing property of the heater according to the first invention. Specifically, the base includes a plurality of layers, that is, an outer layer made of metal that is excellent in heat resistance and oxidation resistance, and an inner layer made of metal that is excellent in heat conductivity. The base may include only two layers. Alternatively, the base may include three layers or may include three or more layers. A method of layering metals is not limited. For example, metals may be bonded together by pressure. More specifically, a cladding member is usable. In addition, for example, metals may be layered by plating.

As described above, in the case where an electrically conductive member is used as the material for the base, the insulating layer is preferably provided on the electrically conductive member. The material for the insulating layer is not particularly limited as long as the insulating layer is capable of electrically insulating the electrically conductive member that forms the base from the electric resistance heating wires. Preferable examples of the material may include glass, ceramic, glass-ceramic, and the like. In particular, in a case where a metal (e.g., stainless steel) is used as the material for the base, the material for the insulating layer is preferably glass from the viewpoint of its thermal expansion balance, more preferably crystallized glass and semi-crystallized glass. Specifically, $SiO_2$—$Al_2O_3$-MO glass is preferably used. Herein, MO represents alkaline earth metal oxide (e.g., MgO, CaO, BaO, SrO). The thickness of the insulating layer is not particularly limited, but is preferably set in a range from 30 to 200 μm.

In a case where the base is made of ceramic, the ceramic to be used herein may be electrically insulated from the heating cells disposed on the base, at high temperature. Examples thereof may include aluminum oxide, aluminum nitride, zirconium oxide, silicon dioxide, mullite, spinel, cordierite, silicon nitride, and the like. One kind of these materials may be used solely. Alternatively, two or more kinds of these materials may be used in combination. In particular, aluminum oxide and aluminum nitride are preferably used. In addition, examples of a composite material of metal and ceramic may include SiC/C, SiC/Al, and the like. One kind of these materials may be used solely. Alternatively, two or more kinds of these materials may be used in combination.

As described above, in the case of heating an object to be heated in such a manner that the object to be heated and the heater are relatively swept in the sweep direction with the heating face of the heater disposed opposite the object to be heated, the sectional shape of the base in the sweep direction may be an arc shape that is bowed toward the object to be heated, with an axis perpendicular to the sweep direction defined as a center (i.e., a shape obtained by cutting a column or a cylinder in a plane parallel to a center axis). Each of the electric resistance heating wires may be disposed on the bowed face or may be disposed on a face opposite to the bowed face (i.e., a recessed face). According to this shape, the heater can be mounted to a cylindrical roll. When the roll is rotated, an object to be heated, which is swept on the roll, can be heated effectively.

[9] Other Circuits

The heater 1 may include other circuits in addition to the heating cells described above. Examples of the other circuits may include a power supply wire for supplying power to each heating cell, a land to which an external wire is connected for supplying power to the heater 1, and the like. The heater 1 may include only one kind of the circuits or may include two or more kinds of the circuits. As a matter of course, each of the heating cells may include a power supply wire part

[10] Applications

The heater according to the first invention may be incorporated in an image-forming device, such as a printer, a copier, or a facsimile, a fixing device, or the like, and may be utilized as a fixing heater for fixing toner, ink, or the like onto a recording medium. Alternatively, the heater according to the first invention may be incorporated in a heating machine, and may be utilized as a heating device for uniformly heating (drying or baking) an object to be processed, such as a panel. In addition, the heater according to the first invention may suitably perform heat treatment for metal products, heat treatment for coatings or films formed on bases having various shapes, and the like. Specifically, the heater according to the first invention may be utilized for, for example, performing heat treatment on coatings (filter constituent materials) for flat panel displays; drying paint on painted metal products, automobile-related products, wooden products, and the like; drying electrostatic flocking adhesives; performing heat treatment on plastic products; performing reflow soldering on printed circuit boards; and drying printed thick-film integrated circuits.

[2] Heater According to the Second Invention

A heater (1') according to the second invention is a heater for heating an object to be heated in such a manner that at least one of the object to be heated and the heater is swept with the heater disposed opposite the object to be heated.

In addition, the heater (1') includes a base (2) having a rectangular shape, and a plurality of heating cells (C) each independently receiving power supply, the heating cells (C) being disposed on the base (2) and arranged in a longitudinal direction ($T_2$) of the base (2).

Each of the heating cells (C) includes a plurality of lateral wires ($L_1$) extending in substantially parallel with the longitudinal direction of the base (2), and a plurality of oblique wires ($L_3$) tilted relative to the lateral wires ($L_1$), and the lateral wires ($L_1$) and the oblique wires ($L_3$) are connected to form a serpentine shape as a whole.

In addition, an insulation gap (I) is interposed between adjoining two of the heating cells (C) so as to meander between the two heating cells (C), and is tilted to one side in the longitudinal direction as a whole (see FIGS. 16 to 19).

Herein, an "insulation gap I" refers to a gap that is interposed between two heating cells C adjoining each other and meanders between the two heating cells C to separate the two heating cells C from each other, thereby insulating the two heating cells C from each other. As to this insulation gap I, both the side edges are not necessarily defined by wires, but only one of the side edges may be defined by a wire. Typically, a width of this gap is set to be equal to a width of a gap between oblique wires $L_3$ (see FIGS. 18(*a*), 18(*b*), and 19).

Figure 18:
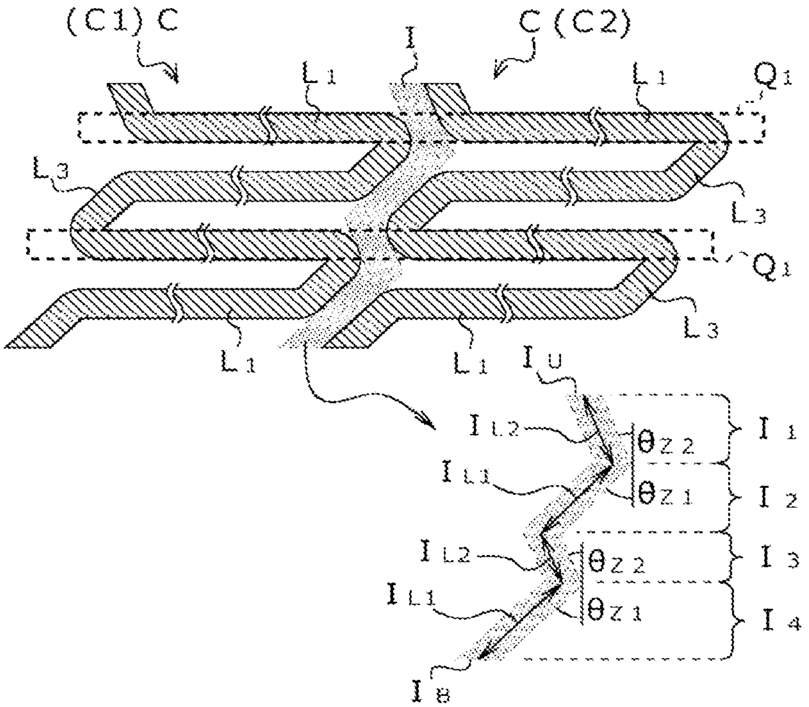
FIG. 18(*a*) is an explanatory view that illustrates the details of the heater illustrated in FIG. 16, and FIG. 18(*b*) is an explanatory view that illustrates the details of the heater illustrated in FIG. 17.
Figure 18:
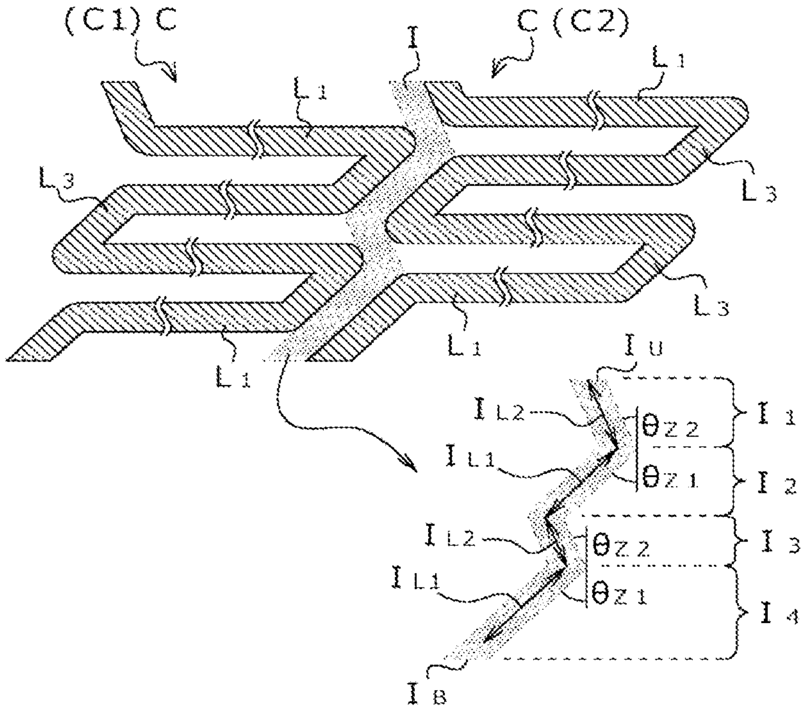

In addition, "the insulation gap I is tilted to one side in the longitudinal direction as a whole" means that an upper end $I_U$ of the insulation gap I in a sweep direction $T_1$ is not aligned in the sweep direction $T_1$ with a lower end $I_B$ of the insulation gap I in the sweep direction $T_1$ (see FIGS. 18(*a*), 18(*b*), and 19). Since the upper end $I_U$ is not aligned with the lower end $I_B$ in the sweep direction $T_1$, a thermal space defined by the insulation gap I can be dispersed in the longitudinal direction $T_2$. This is particularly effective in a case of using a base 2 having a narrow width in the sweep direction $T_1$. Specifically, using the base 2 having a narrow width in the sweep direction $T_1$ (the width of the base 2 has been described in the heater 1 according to the first invention) sometimes makes it difficult to cause the insulation gap I to be continuously tilted to only one side in the longitudinal direction $T_2$ without causing the insulation gap I to meander. In this case, it is possible to realize the dispersion described above by causing the insulation gap I to be tilted in one direction as a whole while causing the insulation gap I to meander.

In this heater 1', the insulation gap I may include: a plurality of first gaps (e.g., $I_2$ and $I_4$ in FIGS. 18(*a*) and 18(*b*)) located between oblique wires $L_3$ of first and second heating cells C1 and C2 adjoining each other in the longitudinal direction, the first gaps being equal in tilt angle to the oblique wires $L_3$; and a plurality of second gaps (e.g., $I_1$ and $I_3$ in FIGS. 18(*a*) and 18(*b*)) tilted oppositely to the first gaps, the second gaps being shorter in path length than the first gaps. As illustrated in FIGS. 18*a* and 18*b*, specifically, a relation of "$L_{L1}>I_{L2}$" may be satisfied, in which $I_{L2}$ represents the path length of each second gap, and $I_{L1}$ represents the path length of each first gap. In this case, the first gaps (e.g., $I_2$ and $I_4$) may be equal in path length $I_{L1}$ to each other or may be different in path length $I_{L1}$ from each other. Likewise, the second gaps (e.g., $I_1$ and $I_3$) may be equal in path length $I_{L2}$ to each other or may be different in path length $I_{L2}$ from each other. The insulation gap I may include either a continuous part of the first gap, second gap, and first gap arranged continuously in this order (e.g., a continuous part of $I_2$, $I_3$, and $I_4$) or a continuous part of the second gap, first gap, and second gap arranged continuously in this order (e.g., a continuous part of $I_1$, $I_2$, and $I_3$) (see FIGS. 18(*a*) and 18(*b*)).

Also in the heater 1', an angle ($\theta_{Z1}$) formed by each first gap (e.g., $I_2$ and $I_4$ in FIGS. 18(*a*) and 18(*b*)) with respect to the sweep direction $T_1$ may be equal to or different from an angle ($\theta_{Z2}$) formed by each second gap (e.g., $I_1$ and $I_3$ in FIGS. 18(*a*) and 18(*b*)) with respect to the sweep direction (see FIGS. 18(*a*) and 18(*b*)). In other words, a relation of "$\theta_{Z1}\neq\theta_{Z2}$" may be satisfied as illustrated in FIGS. 18*a* and 18*b*. As described above, the insulation gap I includes two kinds of gaps that are alternately arranged and are different in path length from each other. Alternatively, the insulation gap I includes at least two kinds of gaps that are different in angle relative to the sweep direction $T_1$ from each other. The insulation gap I can thus be tilted to one side in the longitudinal direction $T_2$ as a whole.

In the heater 1' according to the second invention, the insulation gap I can be formed without gaps extending in parallel with lateral wires $L_1$ (see FIGS. 16 to 19). Specifically, the insulation gap I can be formed without components extending in parallel with the longitudinal direction $T_2$ (gap parts). In other words, it can be said that the insulation gap I can be formed only by gaps tilted relative to the longitudinal direction $T_2$. With this configuration, it is possible to disperse a thermal space at a short distance in the longitudinal direction $T_2$. In other words, this configuration is particularly suitable for a heater that is narrow in the sweep direction $T_1$. Preferably, the insulation gap I does not include a gap extending in a direction orthogonal to the sweep direction $T_1$.

As described above, the heater 1 according to the first invention is configured to solve a problem resulting from a fact that an amount of heat generated at an outer peripheral side of a folded part is smaller than that at an inner peripheral side of the folded part since electric current flowing through the folded part formed at an acute angle tends to flow through an inner side of a wire. The heater 1' according to the second invention solves a problem similar to that described above, in such a manner that a folded part formed at an acute angle is chamfered, and a folded part in another heating cell adjacent to the folded part is projected toward a space defined by this chamfering (heater 1') (see FIGS. 16 and 17).

In the heater 1', specifically, each of the heating cells C includes a plurality of lateral wires $L_1$ extending in substantially parallel with the longitudinal direction $T_2$ of the base 2, and a plurality of oblique wires $L_3$ tilted relative to the lateral wires $L_1$, and the lateral wires $L_1$ and the oblique wires $L_3$ are connected to form a serpentine shape as a whole.

Each of the heating cells C also includes a fourth folded part $D_4$ where a corresponding one of the lateral wires $L_1$ and a corresponding one of the oblique wires $L_3$ are folded at an obtuse angle, and a fifth folded part $D_5$ where a corresponding one of the lateral wires $L_1$ and a corresponding one of the oblique wires $L_3$ are folded at an acute angle. The fourth folded part $D_4$ and fifth folded part $D_5$ are chamfered at their outer peripheries. In addition, the fourth folded part $D_4$ of the first heating cell C1, the fifth folded part $D_5$ of the first heating cell C1, the fourth folded part $D_4$ of the second heating cell C2, and the fifth folded part $D_5$ of the second heating cell C2 are connected to form an imaginary quadrilateral where the fourth folded parts $D_4$ are diagonally opposite to each other, and the fifth folded parts $D_5$ are diagonally opposite to each other.

Figure 16:
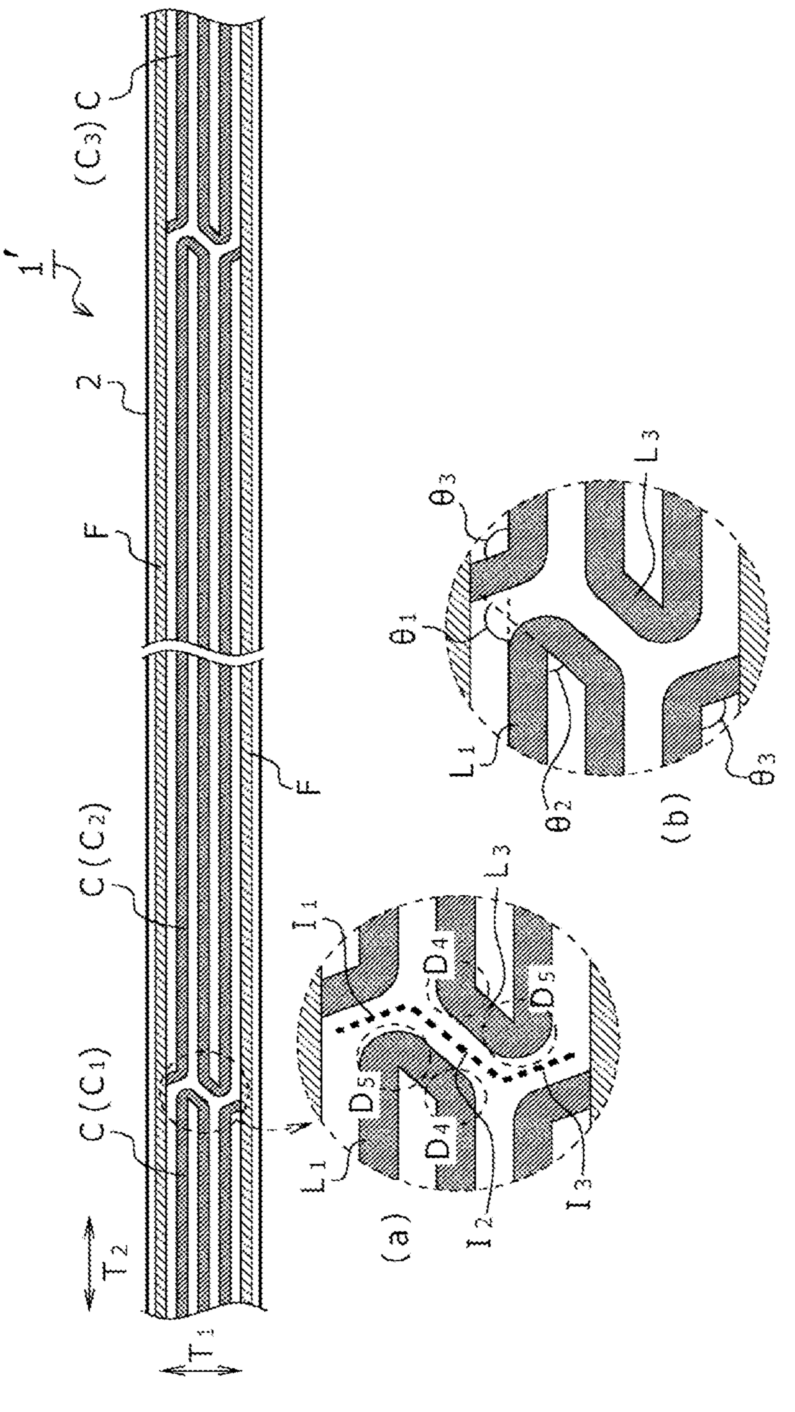
FIG. 16 is a schematic plan view that shows still another example of the heater.
Figure 17:
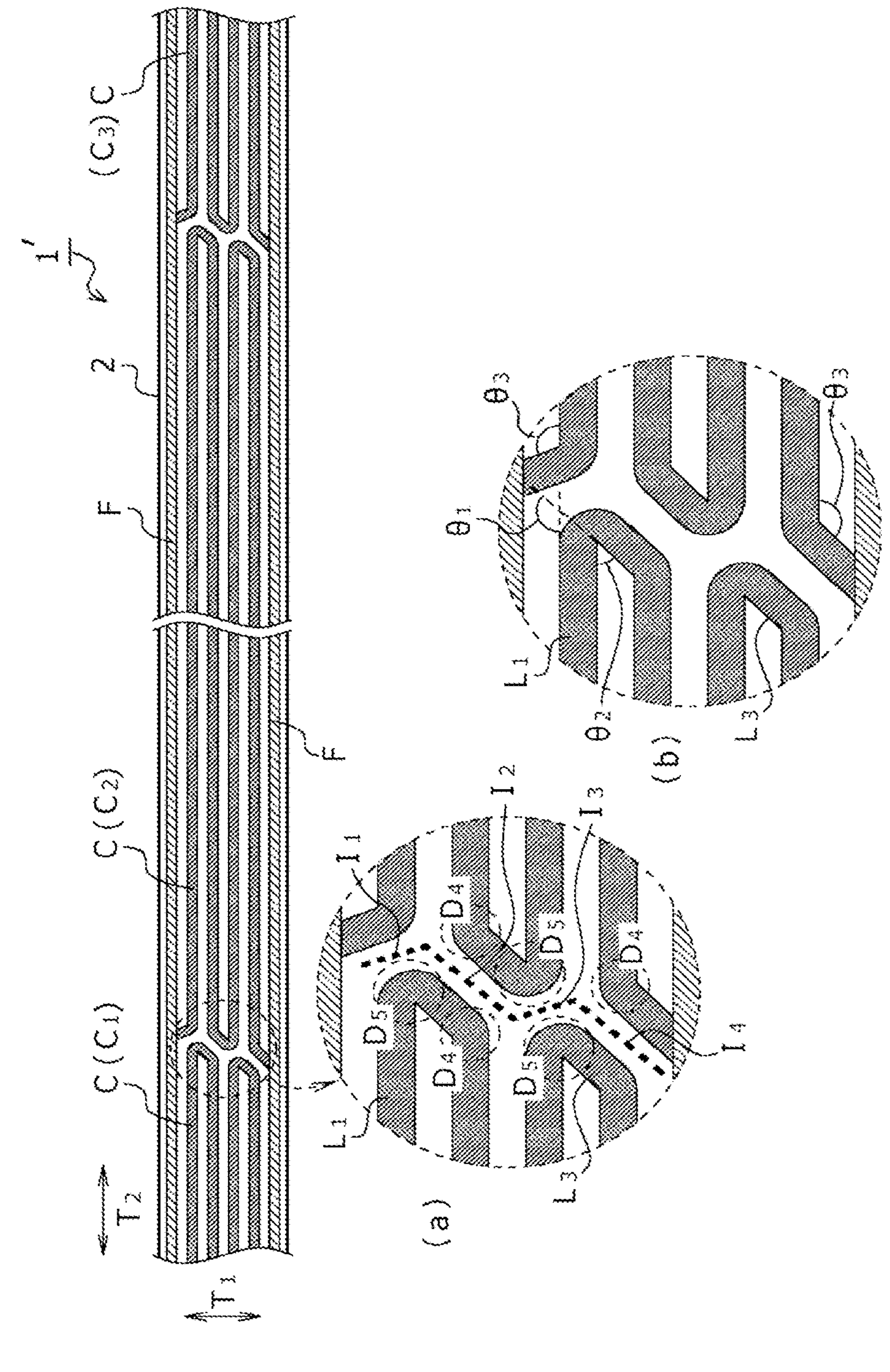
FIG. 17 is a schematic plan view that shows yet another example of the heater.

In the heater 1', as indicated by bold dotted lines in partially enlarged views of FIGS. 16 and 17 (a of FIG. 16 and a of FIG. 17), it is possible to disperse an insulation gap toward oblique wires $L_3$ while causing the insulation gap to meander. Specifically, an insulation gap $I_2$ and an insulation gap $I_4$ each of which is located between two oblique wires $L_3$ are equal in tilt angle to the oblique wires $L_3$. On the other hand, an insulation gap $I_1$ and an insulation gap $I_3$ each of which is not located between two oblique wires $L_3$ are tilted oppositely to the oblique wires $L_3$. The insulation gaps $I_1$ and $I_3$ are formed to be shorter than the insulation gaps $I_2$ and $I_4$, so that the insulation gap I meanders while being dispersed toward the oblique wire $L_3$.

In the heater 1', accordingly, a region (i.e., a folded part) that tends to generate heat as compared with other parts can be positively concentrated between two heating cells.

In the foregoing heater 1 according to the first invention, as a tilt angle $\theta_1$ of an oblique wire $L_3$ is larger, a triangle space (insulation gap) inside a first folded part $D_1$ is larger. On the other hand, the heater 1' according to the second invention has an advantage that even when a tilt angle $\theta_1$ of an oblique wire $L_3$ is large, a space (insulation gap) inside a fourth folded part $D_4$ and a fifth folded part $D_5$ is not enlarged.

It should be noted that lateral wires $L_1$ in the heater 1' according to the second invention are similar to the lateral wires $L_1$ in the heater 1 according to the first invention. When lateral wires $L_1$ of each heating cell C are elongated in the longitudinal direction, a lateral wire $L_1$ of one heating cell C and a lateral wire $L_1$ of another heating cell C fall within a single extension range $Q_1$ (see FIG. 18*a*). These lateral wires $L_1$ may fall within different extension ranges, respectively (see FIG. 18*b*). The heater 1' according to the second invention may adopt any of the forms described above.

In addition, oblique wires $L_3$ in the heater 1' according to the second invention are similar to the oblique wires $L_3$ in the heater 1 according to the first invention. A tilt angle of an oblique wire $L_3$ (i.e., an angle $\theta_1$ formed by a lateral wire $L_1$ and an oblique wire $L_3$ (see b of FIG. 16 and b of FIG. 17) is not limited, and may be set in a range from 91 degrees or more to 179 degrees or less. The tilt angle is preferably in a range from 105 degrees or more to 160 degrees or less, more preferably in a range from 115 degrees or more to 155 degrees or less, still more preferably in a range from 120 degrees or more to 150 degrees or less, particularly preferably in a range from 125 degrees or more to 145 degrees or less. As to these preferable numerical ranges, a more preferable range is capable of suppressing a heat generation loss to be smaller. An angle $\theta_2$ formed by a lateral wire $L_1$ and an oblique wire $L_3$ (see b of FIG. 16 and b of FIG. 17) typically satisfies a relation of $\theta_2=180-\theta_1$. Therefore, as the angle $\theta_1$ increases, the angle $\theta_2$ accordingly decreases. Angles $\theta_3$ illustrated in b of FIG. 16 and b of FIG. 17 (i.e., angles formed when wires constituting heating cells C are connected to power supply wires) each may be an appropriate angle within a range that satisfies the configuration of the heater 1' according to the second invention.

Figure 19:
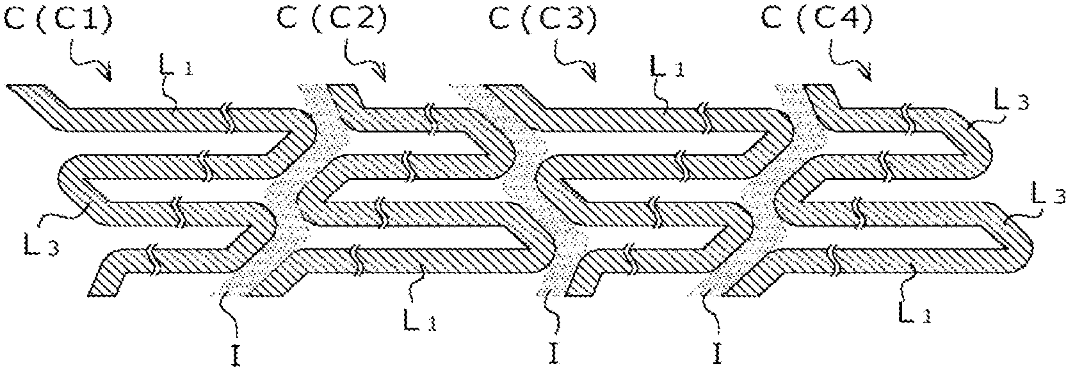
FIG. 19 is a schematic plan view that shows yet another example of the heater.

The heater 1' according to the second invention is also similar in heating cells C to the heater 1 according to the first invention. Specifically, each of the heating cells C has a serpentine shape, and the plurality of heating cells C are electrically connected in parallel (i.e., the plurality of heating cells each independently receive power supply). As illustrated in FIGS. 18*a* and 18*b*, for example, one heating cell C may have a general shape of a substantial parallelogram. In addition, as illustrated in FIG. 19, one heating cell C may have a general shape of a substantially trapezoidal shape. In a case where a general shape of one heating cell C is a substantially trapezoidal shape, as illustrated in FIG. 19, heating cells that are equal in pattern shape to one another are turned upside down (one ends and the other ends of heating cells in the sweep direction $T_1$ are inverted), so that heating cells in a normal state and heating cells in an inverted state may be arranged alternately.

The heater 1' according to the second invention is also similar in chamfered form of each part to the heater 1 according to the first invention. The chamfered form is not limited as long as each part is chamfered so as to ensure insulation. In addition, an outer periphery of a wire constituting a heating cell C may be chamfered. Alternatively, an inner periphery of the wire may be chamfered. Still alternatively, both the outer periphery and the inner periphery may be chamfered. The heater 1' according to the second invention is also similar in electric resistance heating wires, base, other circuits, applications, and the like to the heater 1 according to the first invention.

As in the case of the heater 1 according to the first invention, the degree of a heat generation loss can be grasped from a comparison between a range X and a range Y. As in the case of the heater 1 according to the first invention, moreover, the degree of the heat generation loss can be grasped more accurately when a chamfered region is defined as an actual heat generation region.

[3] Fixing Device

A fixing device including a heater according to the present invention (including the heater 1 according to the first invention and the heater 1' according to the second invention) may employ a configuration that is appropriately selected depending on a target to be heated, a fixing means, and the like. For example, in a case where a fixing device includes a fixing means that involves compression bonding to fix toner or the like onto a recording medium such as a sheet of paper or to laminate multiple members, the fixing device may include a heating unit provided with a heater, and a pressure unit. As a matter of course, the fixing means may be configured to involve no compression bonding. In the present invention, the fixing device is preferably a fixing device 5 for fixing an unfixed image composed of toner and formed on a surface of a recording medium such as a sheet of paper or a film, onto the recording medium.

Figure 20:
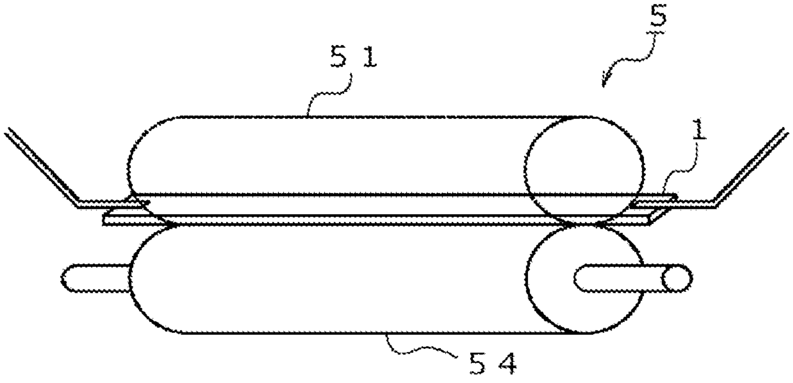
FIG. 20 is a schematic perspective view that shows one example of a fixing device including a heater.

FIG. 20 shows main components of the fixing device 5 that is disposed in an electrophotographic image-forming device. The fixing device 5 includes a fixing roll 51 that is rotatable and a pressure roll 54 that is rotatable. A heater 1 is disposed inside the fixing roll 51. Preferably, the heater 1 is disposed in proximity to an inner surface of the fixing roll 51.

The heater 1 may employ the following structure. For example, the heater 1 is secured to an inner side of a heater holder 53 made of a material capable of conducting heat generated by the heater 1, and the heat generated by the heater 1 is transmitted from an inner side to an outer surface of the fixing roll 51, like a fixing means 5 shown in FIG. 22.

Figure 21:
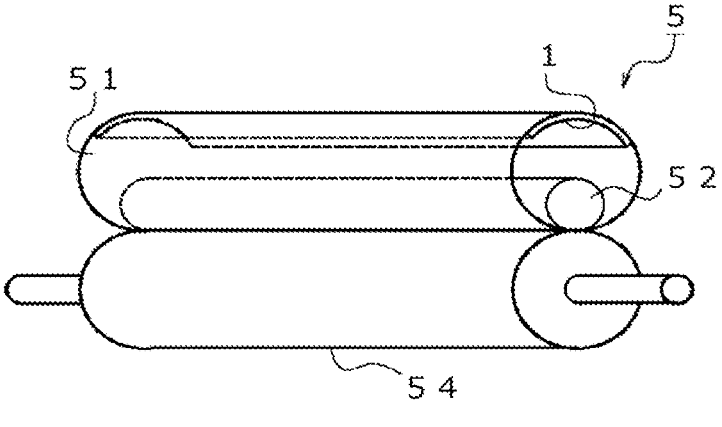
FIG. 21 is a schematic perspective view that shows another example of the fixing device including the heater.

FIG. 21 also shows main components of a fixing device 5 that is disposed in an electrophotographic image-forming device. The fixing device 5 includes a fixing roll 51 that is rotatable and a pressure roll 54 that is rotatable. A heater 1 that transmits heat to the fixing roll 51 and a stationary pad 52 that comes into pressure contact with a recording medium in conjunction with the pressure roll 54 are disposed inside the fixing roll 51. The heater 1 is disposed to be fit to a cylindrical face of the fixing roll 51.

In the fixing device 5 shown in FIG. 20 or 21, when a power source device (not shown) applies voltage to the heater 1, the heater 1 generates heat. The heat is transmitted to the fixing roll 51. When a recording medium having on its surface an unfixed toner image is fed between the fixing roll 51 and the pressure roll 54, the toner is melted and the fixed image is thus formed at a pressure contact part between the fixing roll 51 and the pressure roll 54. The fixing roll 51 and the pressure roll 54 rotate together since they have the pressure contact part. As described above, the heater 1 suppresses a local temperature rise that is apt to occur in a case of using a small recording medium. Therefore, temperatures at the fixing roll 51 hardly become uneven, so that a toner image can be fixed uniformly.

Another aspect of the fixing device including the heater 1 may be a mold die including an upper die and a lower die, in which a heater is disposed inside at least one of the upper die and the lower die.

The fixing device including the heater 1 preferably serves as a heat source for heating, heat retaining, and other purposes in an image-forming device such as an electrophotographic printer or an electrophotographic copier, a household electric appliance, a precision machine for business use, an experimental precision machine, or the like.

[4] Image-Forming Device

Figure 22:
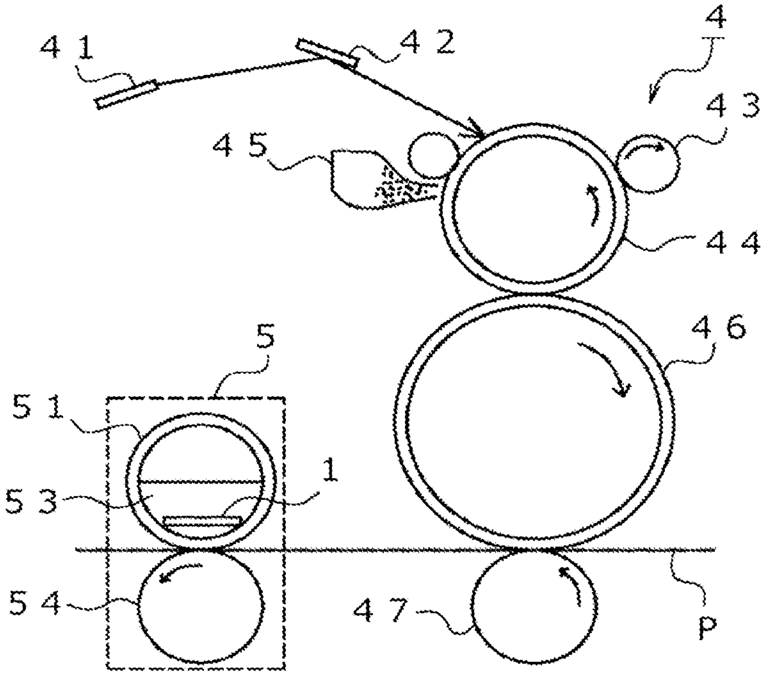
FIG. 22 is a schematic view that shows one example of an image-forming device including a heater.

An image-forming device including a heater according to the present invention (including the heater 1 according to the first invention and the heater 1' according to the second invention) may employ a configuration that is appropriately selected depending on a target to be heated, a purpose of heating, and the like. In the present invention, as shown in FIG. 22, the image-forming device is preferably an image-forming device 4 including an image-forming means that forms an unfixed image on a surface of a recording medium P such as a sheet of paper or a film, and a fixing means 5 that includes a heater 1 and fixes the unfixed image onto the recording medium. The image-forming device 4 may be configured to include, in addition to the means described above, a recording medium conveying means, and a control means for controlling the respective means.

FIG. 22 is a schematic view that shows main components of the electrophotographic image-forming device 4. The image-forming means may be of a type including a transfer drum or may be of a type including no transfer drum. The image-forming means shown in FIG. 22 includes a transfer drum.

In the image-forming means, a photosensitive drum 44 is electrically charged by an electric charger 43 at a predetermined potential while being rotated, the charged face of the photosensitive drum 44 is irradiated with a laser beam output from a laser scanner 41, and an electrostatic latent image is formed of toner supplied from a developer 45. Next, a toner image is transferred onto a surface of a transfer drum 46 that operates together with the photosensitive drum 44, by use of a potential difference. Thereafter, the toner image is transferred onto a surface of a recording medium fed between the transfer drum 46 and a transfer roll 47, so that the recording medium having an unfixed image is obtained. The toner is particulate matter containing a resin binder, a colorant, and an additive, and the resin binder has a melting temperature of typically 90° C. to 250° C. The photosensitive drum 44 and the transfer drum 46 each may have a surface provided with a cleaner for removing unmelted toner and the like.

The fixing means 5 may be similar in configuration to the fixing device 5 described above. The fixing means 5 includes a pressure roll 54 and a fixing roll 51. The fixing roll 51 incorporates therein a heater holder 53 holding a heater 1 configured to apply electric power in a sheet passing direction, and operates together with the pressure roll 54. The recording medium having the unfixed image is fed between the fixing roll 51 and the pressure roll 54 from the image forming means. The toner image on the recording medium is melted by heat from the fixing roll 51. In addition, the melted toner is pressurized at a pressure contact part between the fixing roll 51 and the pressure roll 54. The toner image is thus fixed onto the recording medium. The fixing means 5 in FIG. 22 may include a fixing belt that is disposed in proximity to the heater 1, in place of the fixing roll 51.

Typically, in a case where an amount of heat to be applied to the toner is too small due to uneven temperatures at the fixing roll 51, the toner is peeled off the recording medium. On the other hand, in a case where the amount of heat is too large, the toner adheres to the fixing roll 51 and then adheres again to the recording medium when the fixing roll 51 rotates once. With the fixing means 5 including the heater according to the present invention, the temperatures are promptly adjusted to a predetermined temperature, so that the drawbacks can be suppressed.

The image-forming device according to the present invention suppresses an excessive temperature rise at a region where no sheet passes in practical use, and preferably serves as an electrophotographic printer, an electrophotographic copier, or the like.

[5] Heating Device

A heating device including a heater according to the present invention (including the heater 1 according to the first invention and the heater 1' according to the second invention) may employ a configuration that is appropriately selected depending on the size, shape, and the like of a target to be heated. In the present invention, for example, the heating device may be configured to include a housing part, a window part that is hermetically sealable and is disposed for taking an object to be subjected to heat treatment into and out of the heating device, and a heater part that is movable and is disposed inside the housing part. As required, the heating device may include, for example, a mount part that is disposed inside the housing part for mounting thereon the object to be subjected to heat treatment, an exhaust part that is also disposed inside the housing part for discharging gas when the gas is discharged by heat application to the object to be subjected to heat treatment, and a pressure adjustment part, such as a vacuum pump, that is also disposed inside the housing part for adjusting a pressure inside the housing part. The heat application may be performed in a state in which the object to be subjected to heat treatment and the heater part are stationary, or may be performed in a state in which either the object to be subjected to heat treatment or the heater part is movable.

The heating device according to the present invention preferably serves as a device that dries an object to be subjected to heat treatment, which includes water, an organic solvent, and the like, at a desired temperature. Moreover, the heating device according to the present invention may be used as a vacuum dryer (decompression dryer), a pressure dryer, a dehumidifying dryer, a hot-air dryer, an explosion-proof dryer, or the like. The heating device according to the present invention also preferably serves as a device that bakes at a desired temperature an LCD panel, an organic EL panel, or the like that is not baked yet. Moreover, the heating device according to the present invention may be used as a decompression baking machine, a pressure baking machine, or the like.

It should be noted that the present invention is not limited to those described in the foregoing specific embodiments and may encompass various embodiments that are modified within the scope of the present invention in accordance with purposes and applications.

REFERENCE SIGNS LIST

1, 1'; heater,
2; base,
4; image-forming device, 41: laser scanner, 42: mirror, 43: electric charger, 44: photosensitive drum, 45: developer, 46: transfer drum, 47: transfer roll,
5: fixing device (fixing means), 51: fixing roll, 52: stationary pad, 53: heater holder, 54: pressure roll,
C; heating cell,
$D_1$; first folded part,
$D_2$; second folded part,
$D_3$; third folded part,
F; power supply wire,
I; insulation gap,
$L_1$; lateral wire,
$L_2$; inversely oblique wire,
$L_3$, $L_{33}$; oblique wire,
S; thermal space, $S_D$; imaginary quadrilateral,
$T_1$; sweep direction, $T_2$; direction perpendicular to sweep direction.

The invention claimed is:

1. A heater for heating an object to be heated in such a manner that the object to be heated is swept with the heater disposed opposite the object to be heated,
the heater comprising:
a base having a rectangular shape; and
a plurality of heating cells each independently receiving power supply,
the heating cells being disposed on the base and arranged in a longitudinal direction of the base,
wherein
each of the heating cells includes a plurality of lateral wires extending in substantially parallel with the longitudinal direction of the base, and a plurality of straight oblique wires tilted relative to the lateral wires,
the lateral wires and the straight oblique wires are connected to form a serpentine shape as a whole,
each of the heating cells further includes a first folded part where a corresponding one of the lateral wires and a corresponding one of the straight oblique wires are folded at an obtuse angle,
in the first folded part, an end of the lateral wire is connected to a first end of a straight inversely oblique wire, a second end of the straight inversely oblique wire is connected to a first end of the straight oblique wire, forming an acute angle or a right angle with respect to the straight oblique wire and a second end of the straight oblique wire is connected to a power supply wire,
each of the heating cells includes a second folded part where a corresponding one of the lateral wires and a corresponding one of the straight oblique wires are folded at an acute angle, the second folded part being juxtaposed to the first folded part, and
the second folded part is chamfered in correspondence with the straight inversely oblique wire.

2. The heater according to claim 1, wherein
the heating cells comprise a first heating cell and a second heating cell adjoining each other in the longitudinal direction,
each of the first heating cell and the second heating cell includes the first folded part and the second folded part, and
the first folded part of the first heating cell, the second folded part of the first heating cell, the first folded part of the second heating cell, and the second folded part of the second heating cell are connected to form an imaginary quadrilateral where the first folded part is diagonally opposite to the first folded part, and the second folded part is diagonally opposite to the second folded part.

3. A fixing device comprising
the heater according to claim 1.

4. An image-forming device comprising
the heater according to claim 1.

5. A heating device comprising
the heater according to claim 1.

* * * * *